US012125692B2

(12) United States Patent
Makarov et al.

(10) Patent No.: US 12,125,692 B2

(45) Date of Patent: Oct. 22, 2024

(54) COMPLEMENTED ION FUNNEL FOR MASS SPECTROMETER

(71) Applicants: Thermo Fisher Scientific (Bremen) GmbH, Bremen (DE); THERMO FINNIGAN LLC, San Jose, CA (US)

(72) Inventors: Alexander A. Makarov, Bremen (DE); Eloy R. Wouters, San Jose, CA (US); Joshua A. Silveira, San Jose, CA (US); Mikhail G. Skoblin, Dolgoprudny (RU); Viacheslav Kozlovskiy, Chernogolovka (RU)

(73) Assignees: Thermo Fisher Scientific (Bremen) GmbH, Bremen (DE); Thermo Finnigan LLC, San Jose, CA (US)

( * ) Notice: Subject to any disclaimer, the term of this patent is extended or adjusted under 35 U.S.C. 154(b) by 545 days.

(21) Appl. No.: 17/345,549

(22) Filed: Jun. 11, 2021

(65) Prior Publication Data

US 2022/0399199 A1 Dec. 15, 2022

(51) Int. Cl.

*H01J 49/06* (2006.01)
*H01J 49/00* (2006.01)
*H01J 49/24* (2006.01)

(52) U.S. Cl.

CPC ........ *H01J 49/066* (2013.01); *H01J 49/0031* (2013.01); *H01J 49/24* (2013.01)

(58) Field of Classification Search

CPC ...... H01J 49/066; H01J 49/0031; H01J 49/24; H01J 49/0404; H01J 49/062

(Continued)

(56) References Cited

U.S. PATENT DOCUMENTS 6,583,408 B2 6/2003 Smith et al.
7,671,344 B2 * 3/2010 Tang .................... H01J 49/066 250/396 R (Continued)

FOREIGN PATENT DOCUMENTS

WO 2019229463 A1 12/2019

OTHER PUBLICATIONS

Chen, Tsung-Chi, Thomas L. Fillmore, Spencer A. Prost, Ronald J. Moore, Yehia M. Ibrahim, and Richard D. Smith. "Orthogonal injection ion funnel interface providing enhanced performance for selected reaction monitoring-triple quadrupole mass spectrometry." Analytical Chemistry, 2015, 87, No. 14, pp. 7326-7331.

*Primary Examiner* — Kiet T Nguyen

(74) *Attorney, Agent, or Firm* — Thomas F. Cooney

(57) ABSTRACT

A mass spectrometry method comprises: (1) introducing ions and gas into an first electrode section of an ion transport apparatus through a slot of an ion transfer tube, the ion tunnel section comprising a first longitudinal axis that is contained within a slot plane of the ion transfer tube, the first longitudinal axis not intersecting an outlet of the ion transfer tube, wherein the apparatus further comprises: (a) a second electrode section configured to receive the ions from the first electrode section and comprising a second longitudinal axis that is not coincident with the first longitudinal axis; and (b) an ion outlet aperture; (2) providing voltages to electrodes of the ion transport apparatus that urge the ions to migrate towards the first longitudinal axis within the first electrode section; and (3) exhausting gas through a port that is offset from the ion outlet aperture.

12 Claims, 19 Drawing Sheets

(58) Field of Classification Search
USPC .......................................... 250/288, 281, 282
See application file for complete search history.

(56) References Cited

U.S. PATENT DOCUMENTS

| | | | | |
|---|---|---|---|---|
| 8,309,916 | B2 | 11/2012 | Wouters et al. | |
| 8,581,181 | B2 | 11/2013 | Giles et al. | |
| 9,761,427 | B2 | 9/2017 | Wouters et al. | |
| 2015/0364313 | A1* | 12/2015 | Zhang ................... | H01J 49/065<br>250/288 |
| 2016/0322209 | A1* | 11/2016 | Wouters ................ | H01J 49/066 |
| 2019/0148122 | A1* | 5/2019 | Sugiyama ............. | H01J 49/063<br>250/288 |
| 2019/0371583 | A1* | 12/2019 | Shion .................... | H01J 49/005 |

* cited by examiner

COMPLEMENTED ION FUNNEL FOR MASS SPECTROMETER

TECHNICAL FIELD

The present disclosure relates to mass spectrometry. More particularly, the present disclosure relates to ion guides comprising a plurality of ring electrodes arranged in a stacked configuration, which are generally described as stacked-ring ion guides.

BACKGROUND

Mass spectrometry (MS) analysis techniques are generally carried out under conditions of high vacuum. However, various types of ion sources that are used to generate ions for MS analyses operate at or near atmospheric pressures. Thus, those skilled in the art are continually confronted with challenges associated with transporting ions and other charged particles generated at atmospheric or near atmospheric pressures, and in many cases contained within a large gas flow, into regions maintained under high vacuum.

Various approaches have been proposed in the mass spectrometry arts for improving ion transport efficiency into low vacuum regions. For example, FIG. 1A is a schematic depiction of a mass spectrometer system 10 which utilizes an ion transport apparatus in the form of a conventional ion funnel 20 to so as to deliver ions generated at near atmospheric pressure to a mass analyzer operating under high vacuum conditions. As depicted, an Atmospheric Pressure Ionization (API) ion source 12 that is housed in an ionization chamber 14 is employed to generate ions from a sample. In the example of FIG. 1A, an electrospray ionization (ESI) source is configured to receive a liquid sample from an associated apparatus such as for instance a liquid chromatograph or syringe pump through a capillary 7. The ion source 12 may alternatively comprise a heated electrospray ionization (H-ESI) source, an atmospheric pressure chemical ionization (APCI) source, an atmospheric pressure matrix assisted laser desorption (MALDI) source, a photoionization source, or a source employing any other ionization technique that operates at pressures substantially above the operating pressure of mass analyzer 28 (e.g., from about 1 Torr to about 2000 Torr). Furthermore, the term "API ion source" is intended to include "multi-mode" ion sources that combine a plurality of the above-mentioned source types. The API source 12 forms charged particles 9 (either ions or charged droplets that may be subsequently desolvated so as to release ions) that are representative of the sample. These charged particles are subsequently transported from the API source 12 to the mass analyzer 28 in high-vacuum chamber 27 through one or more evacuated chambers 18, 26 in which the pressure progressively decreases in the direction of ion transport. In the system 10 that is depicted in FIG. 1A, the droplets or ions are entrained in a background gas and transported from the API ion source 12 through an ion transfer tube 16 that passes through a first partition element or wall 11 into low-vacuum chamber 18 which is maintained at a lower pressure than the pressure of the ionization chamber 14 but at a higher pressure than the pressure of the downstream intermediate-vacuum chamber 26 and high-vacuum chamber 27. The ion transfer tube 16 may be physically coupled to a heating element or block 23 that provides heat to the gas and entrained particles in the ion transfer tube so as to aid in desolvation of charged droplets so as to thereby release free ions.

Because of the difference in pressure between the ionization chamber 14 and the low-vacuum chamber 18 (FIG. 1), gases and entrained ions are caused to flow through ion transfer tube 16 into the low-vacuum chamber 18. A plate or second partition element or wall 15 separates the low-vacuum chamber 18 from the intermediate-vacuum chamber 26 that is maintained at an internal pressure that is lower than that of chamber 18 but higher than that of high-vacuum chamber 27. The ion funnel 20 is employed to separate ions from neutral gas molecules and residual droplets and to focus the ions into the chamber 18 through a pressure-restricting aperture 48 in the partition 15. Conventionally, an ion funnel comprises a stack or plate electrodes or ring electrodes that provide Radio Frequency (RF) electric fields that guide and focus the flux of ions through the aperture 48. In some implementations, the electrodes may also provide an axially-directed electric field that urges ions along the length of the ion funnel 20. One or more ion optical assemblies or lenses 24 in the intermediate-vacuum chamber 26 may be provided so as to transfer or guide ions to the high-vacuum chamber 27 within which the mass analyzer 28 is housed. The mass analyzer 28 comprises one or more detectors 30 whose output can be displayed or recorded as a mass spectrum. Other mass selective or ion manipulation components—such as a mass filter 32 and an ion fragmentation cell 33—may also be housed within the high-vacuum chamber. A differential vacuum pumping system is used to maintain the vacuum pressures in the various evacuated chambers. Vacuum ports 13*a*, 13*b* and 13*c* are used for evacuation of the low-vacuum chamber 18, intermediate vacuum chamber 26 and high-vacuum chamber 27, respectively.

FIG. 1B is a schematic depiction of a known ion transfer system comprising an ion funnel apparatus 20 as taught in U.S. Pat. No. 9,761,427. Generally described, the ion funnel apparatus comprises a plurality of closely longitudinally spaced plate electrodes or ring electrodes 42 that have apertures that define an internal hollow volume within which ions are constrained by electrostatic forces. The internal volume includes an ion funnel portion 44 as well as an ion tunnel section 43. The funnel portion 44 comprises an ion outlet aperture 46 that discharges ions to an evacuated chamber, such as the intermediate vacuum chamber 26 shown in FIG. 1A. The ion tunnel portion 43 of the ion transfer apparatus receives, through an entrance aperture 41, a mixture of gas and ions from a slotted-bore ion transfer tube 17 (see FIGS. 1C-1D) that is used in place of the traditional round-bore capillary tube 16 (see FIG. 1A). The chamber 18 within which the ion transfer apparatus 20 is housed is maintained at a pressure within the general range of 1-10 Torr. The ion transfer apparatus 20 transports the ions to an intermediate-vacuum chamber 26 through the ion outlet aperture 46 and through the aperture 48 in partition 15 while, at the same time, exhausting most of the gaseous molecules and any residual droplets through the gaps between the ring electrodes 42.

The ion tunnel section 43 of the apparatus 20 comprises a first set 49*a* of the ring electrodes 42, all of which comprise a common, constant aperture diameter, $\theta_T$. A second set 49*b* of the electrodes comprise apertures of variable diameter θ, which progressively decrease along the length of the funnel section 44 with increasing proximity to the ion outlet aperture 46 of the apparatus. The second set 49*b* of electrodes focus the ions into a narrow beam that passes through the funnel ion outlet aperture 46 and into the intermediate-vacuum chamber 26 through the aperture 48 in inter-chamber partition 15.

FIGS. 1C-1D show details of the slotted-bore ion transfer tube 17. The tube 17 comprises an inlet end 37 that is disposed within an API ion source and an outlet end 38 that is disposed within an evacuated chamber (e.g., low vacuum chamber 18). In contrast to the circular bores of earlier versions of ion transfer tubes, the internal bore or lumen of the ion transfer tube 17 has a cross-sectional profile in the form of a slot having length, s, and width, w. Preferably, the ends of the slot are rounded, as depicted in FIG. 1D. Chen et al. (Chen, Tsung-Chi, Thomas L. Fillmore, Spencer A. Prost, Ronald J. Moore, Yehia M. Ibrahim, and Richard D. Smith. "Orthogonal injection ion funnel interface providing enhanced performance for selected reaction monitoring-triple quadrupole mass spectrometry." *Analytical chemistry* 87, no. 14 (2015): 7326-7331) observed that the slotted design of the ion transfer tube 17 increases gas flow rate, Q, by a factor of four, thereby yielding marked gains in mass spectrometer sensitivity (approximately twofold to sevenfold) over a standard 0.58 mm round bore capillary. The gain in sensitivity was observed across a wide chromatographic flow rate range (300 nL/min up to 500 μL/min), thereby indicating that the slotted design provides satisfactory desolvation of charged droplets. FIG. 1C also depicts a hypothetical plane 39, herein referred to as a "slot plane" that is defined as a plane that is parallel to the long dimension, s, of the slot 8 and that passes through the center of the slot.

Moreover, as taught in U.S. Pat. No. 9,761,427, improved results are obtained when the longitudinal axis of the slotted bore 8 of the ion transfer tube 17 is disposed, as illustrated in FIG. 1B, at an angle, β, to the central longitudinal axis 47 of the funnel apparatus 20 and when the long dimension, s, of the slot is parallel to the plane defined by the two longitudinal axes. This improvement is attributed to the observation that gas jet expansion emerging from the slot into the lower-pressure funnel apparatus is anisotropic, with greater gas expansion and velocity occurring perpendicular to the slot plane 39. Within the jet, the diameter of the Mach disk taken perpendicular to the slot plane 39 is greater than the diameter of the Mach disk within the slot plane. As a result, it has been found possible to operate a mass spectrometer having the ion transfer tube and funnel configuration depicted in FIG. 1B using only a single stage of foreline pumping. The diameter $\theta_T$ of electrode apertures within the ion tunnel section 43 of the apparatus 20 is chosen sufficiently large to be able to capture the gas Mach disk that emerges from outlet end 38 of the ion transfer tube 17 as well as to radially confine ions. Importantly, it has been found that, using the configuration shown in FIG. 1B, efficient axial transport of ions may be achieved exclusively via fluid dynamics.

An alternative approach to ion transport is taught in U.S. Pat. No. 8,581,181 in the names of inventors Giles et al. The accompanying FIG. 2 is a depiction of an apparatus that is taught in U.S. Pat. No. 8,581,181. According to this alternative approach, gas expansion from an orifice (0.8 mm diameter) occurs inside a stacked ring ion guide 81 having a relatively large inner diameter (e.g., approximately 15 mm). Ions entrained in the gas flow are pulled into a second conjoined ion guide 82 biased with a DC offset relative to the ion guide 81. The second ion guide features a smaller inner diameter (e.g., approximately 5 mm) and thus provides superior radial confinement. This approach has the advantage that ions are removed from the gas expansion and separated from solvent clusters in a single foreline stage. As a consequence, a DC axial field gradient or transient wave is required for axial transport along the second ion guide.

Other alternative ion transport strategies have also been reported including: (1) offsetting the ion outlet apertures of tandem ion funnels, (2) orthogonal positioning of an inlet capillary relative to a funnel axis (U.S. Pat. No. 8,288,717 and Chen, Tsung-Chi, Thomas L. Fillmore, Spencer A. Prost, Ronald J. Moore, Yehia M. Ibrahim, and Richard D. Smith. "Orthogonal injection ion funnel interface providing enhanced performance for selected reaction monitoring-triple quadrupole mass spectrometry." *Analytical chemistry* 87, no. 14 (2015): 7326-7331), and (3) incorporating a jet disruptor (U.S. Pat. No. 6,583,408). Whereas these alternative strategies are compatible with and can efficiently handle the gas load from high-flowrate capillaries, all require an axial DC gradient along the entire length of the funnel which restricts the manufacturability and robustness of the design while adding additional cost, complexity and size.

The ion transport system of FIG. 1B is capable of efficiently transferring ions from an atmospheric ion source to a downstream evacuated chamber without the application of an axial DC electric field. Nonetheless, the inventors have discovered that there is an opportunity to further improve the ion transmission efficiency of this system as a result of the discovery that the axial asymmetry of the ion transfer tube relative to the stacked electrodes can cause disadvantageous gas turbulence within the ion tunnel portion 43 and ion funnel portion 44. This turbulence can disrupt the general flow of ions towards the funnel ion outlet aperture and can cause fragmentation of some ions. There thus remains a need in the mass spectrometry arts for further improvement in the performance of ion transport systems.

Additionally, conventional ion funnel designs and ion transport system designs do not provide for separately admitting a standard calibrant substance into a mass spectrometer independently from the admission of sample material through a single ion transfer tube or, equivalently, through a single ion inlet aperture used instead of an ion transfer tube. If such an independent calibrant inlet were available, then it would be possible to introduce the standard calibrant material at various desired times without disrupting a sequence of simultaneous sample analyses. Provision of an independent calibrant inlet could at least partially address an existing need in the mass spectrometry arts for "real-time" monitoring of instrument accuracy, sensitivity and overall health a without interfering with the analytical measurements.

SUMMARY

The present teachings address both of the above-identified needs in the mass spectrometry arts. Accordingly, in a first aspect of the present teachings, a method of introducing ions generated from an atmospheric ion source into a vacuum chamber of a mass spectrometer system is provided, the method comprising:

introducing the ions and gas into a first electrode section of an ion transport apparatus of the mass spectrometer system through a lobe of a bore of ion transfer tube having an obround cross-sectional shape, the first electrode section comprising a first central longitudinal axis that is contained within a slot plane of the lobe of the ion transfer tube and that does not intersect an outlet of the ion transfer tube, wherein the ion transport apparatus further comprises:

a second electrode section configured to receive the ions from the first electrode section and comprising a second central longitudinal axis that is not coincident with the first central longitudinal axis; and an ion outlet aperture configured to receive the ions from the second electrode section and to transfer the ions to the vacuum chamber;

providing voltages to electrodes of the ion transport apparatus that urge the ions to migrate towards the first and second central longitudinal axes within the first electrode section; and removing a major portion of the gas through an exhaust port that is offset from the ion outlet aperture.

According to some embodiments, the method may further comprise introducing an auxiliary flow of gas into the ion tunnel section from an auxiliary tube, wherein the introducing of the auxiliary flow of gas is simultaneous with the introducing of the ions and gas into the ion tunnel section through the slot of the slotted-bore ion transfer tube. In such instances, the introducing of the auxiliary flow of gas into the ion tunnel section may further comprise introducing a flow of calibrant ions into the ion tunnel section.

According to some embodiments, the step of introducing the ions and gas into the ion tunnel section may comprise introducing the ions and gas into an ion tunnel section that comprises a plurality of stacked, mutually parallel, plate or ring electrodes, each plate or ring electrode comprising a respective aperture, the apertures having identical diameters. In some alternative embodiments, the step of introducing the ions and gas into the ion tunnel section may comprise introducing the ions and gas into an ion tunnel section that comprises a first and a second plurality of stacked, mutually parallel, plate or ring electrodes, each electrode comprising an edge having a respective cutout therein, wherein the second plurality of electrodes is spaced apart from the first plurality of electrodes and wherein the cutouts of the first plurality of electrodes face the cutouts of the second plurality of electrodes. In such latter instances, the step of providing voltages to electrodes of the ion transport system that urge the ions to migrate towards the first central longitudinal axis may comprise applying a DC voltage difference between the first and second pluralities of electrodes.

According to some other alternative embodiments, the step of introducing the ions and gas into the ion tunnel section may comprise introducing the ions and gas into an ion tunnel section that comprises: a plurality of stacked, mutually parallel, plate or ring electrodes, each plate or ring electrode comprising an edge having a respective cutout therein; and a repeller electrode or repeller electrode assembly, wherein an ion trapping volume of the ion tunnel is defined between the repeller electrode or repeller electrode assembly and the plurality of plate or ring electrodes. In such instances, the step of providing voltages to electrodes of the ion transport system that urge the ions to migrate towards the second central longitudinal axis may comprise applying a DC voltage difference between the repeller electrode or electrode assembly and the plurality of plate or ring electrodes. According to yet other alternative embodiments, the step of introducing the ions and gas into the ion tunnel section may comprise introducing the ions and gas into an ion tunnel section that comprises: a plurality of ion carpet electrodes; and a repeller electrode or repeller electrode assembly, wherein an ion trapping volume of the ion tunnel is defined between the repeller electrode or repeller electrode assembly and the plurality of ion carpet electrodes. In such instances, the step of providing voltages to electrodes of the ion transport system that urge the ions to migrate towards the second central longitudinal axis comprises applying a DC voltage difference between the repeller electrode or electrode assembly and the plurality of ion carpet electrodes.

In accordance with a second aspect of the present teachings, an ion transport system for a mass spectrometer is provided, the system comprising:

an ion transfer tube configured to receive ions from an atmospheric pressure ionization (API) ion source and comprising a tube axis;

an apparatus comprising:

a first electrode section configured to receive the ions from an outlet end of the ion transfer tube, wherein the first electrode section comprises a first ion transport volume therethrough;

a second electrode section comprising a second ion transport volume that is configured to receive the ions from the from the first ion transport volume, the second electrode section comprising a longitudinal axis that extends into the first ion transport volume and that is offset from the tube axis;

an ion outlet aperture configured to transfer the ions from the second electrode section to a mass analyzer of the mass spectrometer; and a gas exhaust port or channel that is offset from the ion outlet aperture and that is configured to receive gas molecules and residual droplets emitted from the ion transfer tube; and a power supply that is configured to provide ion transporting voltages to electrodes that urge the ions therein to migrate, within the first ion transport volume, towards the extension of the longitudinal axis that is within the first ion transport volume.

In accordance with the second aspect of the present teachings, an ion transport system for a mass spectrometer is provided, the system comprising:

an ion transfer tube configured to receive ions from an atmospheric pressure ionization (API) ion source and comprising an ion outlet end; and an apparatus comprising:

a first electrode section configured to receive the ions from the ion outlet end of the ion transfer tube, wherein the first electrode section comprises a first ion transport volume therethrough; and an ion funnel comprising:

an ion inlet aperture that is configured to receive the ions from the from the first electrode section;

a second ion transport volume; and an ion outlet aperture that is configured to transfer the ions from the second ion transport volume to a mass analyzer, wherein the ion inlet aperture of the ion funnel is offset from a linear axis defined between the ion outlet end of the ion transfer tube and the ion outlet aperture of the ion funnel.

It is found that, with regard to each aspect of the present teachings, the introduction of an auxiliary gas flow that is discharged into an ion funnel from the auxiliary inlet is able to suppress gas turbulence within the ion funnel that would otherwise lead to ion losses and/or fragmentation. The main criterion for selecting the location, orientation and flow rate of the secondary inlet, relative to the primary inlet, is suppression of vortices that are formed when a strong jet from the primary inlet interacts with the surrounding environment. Gas dynamics calculations may be employed to guide the location, orientation and flow rate of the secondary inlet and the primary inlet.

The apparatus designs taught herein also allow for the use of the auxiliary inlet for calibration purposes. For example, while passing ions through the primary inlet, the second inlet may remain unemployed such that the gas stream from the secondary inlet is comprised of a pure substance (i.e., nitrogen or air). During routine instrument monitoring or calibration, the secondary inlet may be used to transmit calibrant ions into the mass spectrometer to carry out automated calibration or monitoring procedures.

BRIEF DESCRIPTION OF THE DRAWINGS

The above noted and various other aspects of the present invention will become apparent from the following description which is given by way of example only and with reference to the accompanying drawings, not necessarily drawn to scale, in which.

DETAILED DESCRIPTION

Figure 1A:
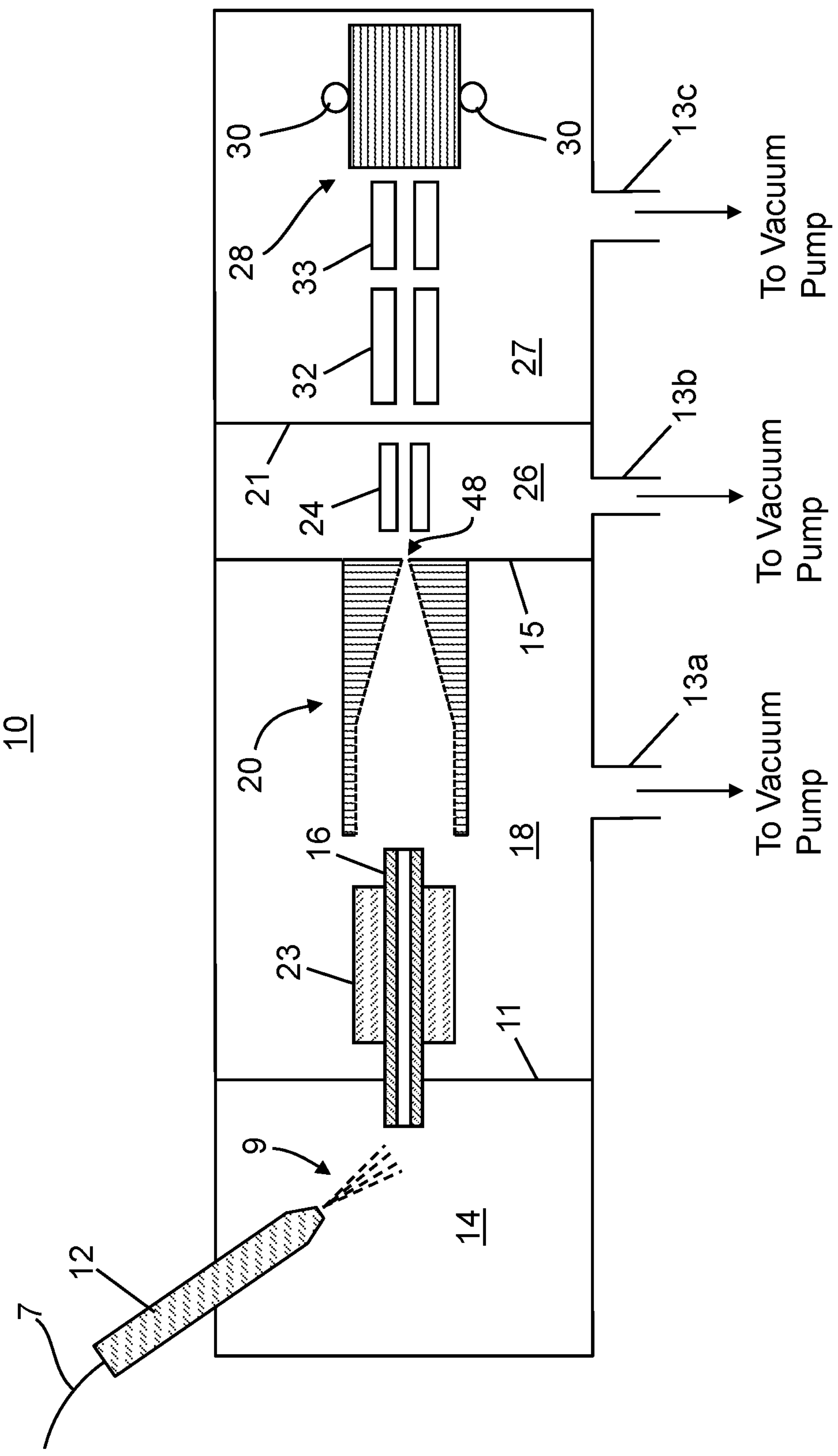
FIG. 1A (Prior Art)
FIG. 1A is a schematic depiction of a known mass spectrometer system comprising an ion funnel apparatus.
Figure 1B:
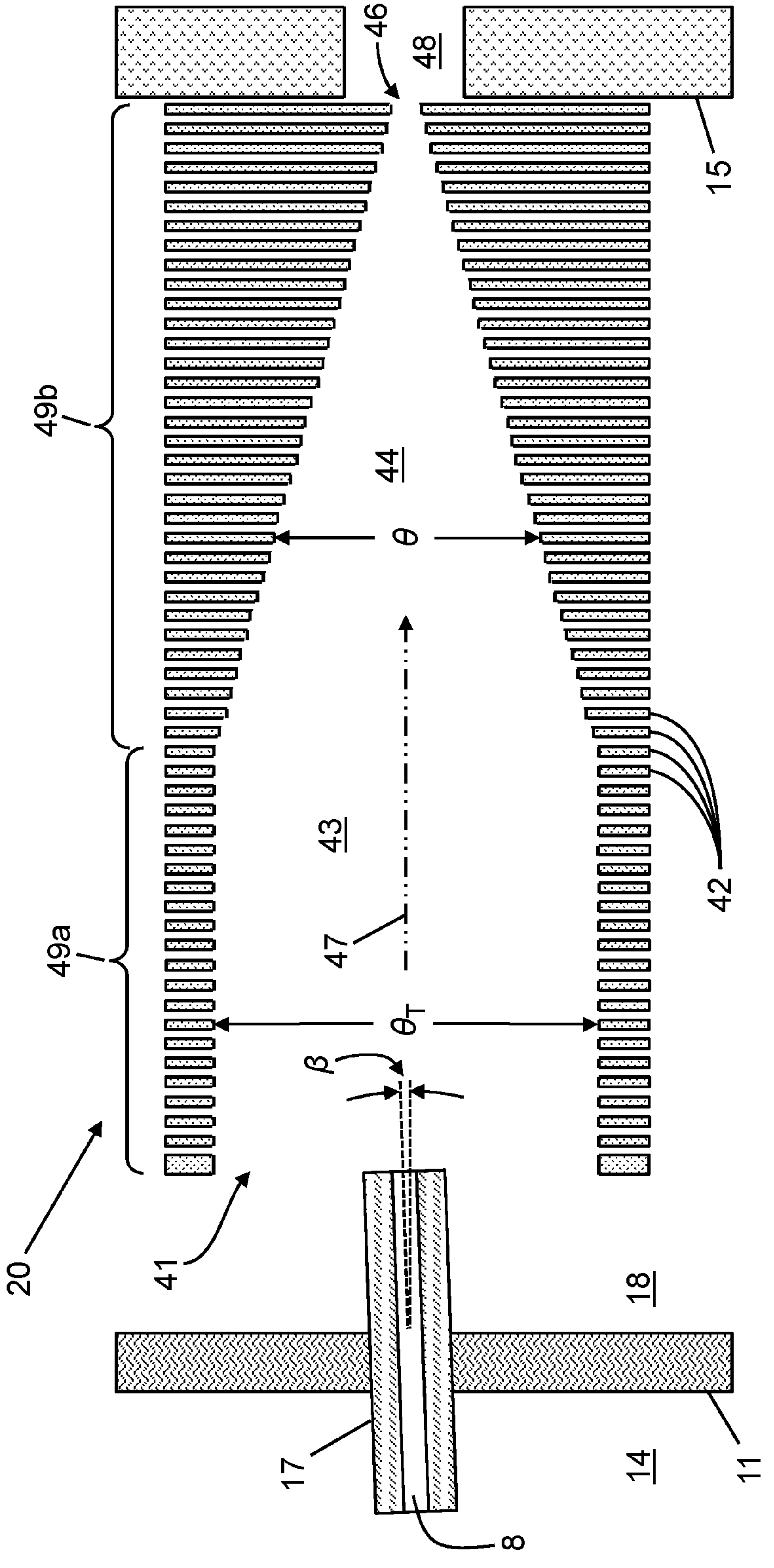
FIG. 1B (Prior Art)
FIG. 1B is a schematic cross-sectional view of a known atmospheric-pressure-to-vacuum ion transport system comprising an ion funnel apparatus.

The following description is presented to enable any person skilled in the art to make and use the invention, and is provided in the context of a particular application and its requirements. Various modifications to the described embodiments will be readily apparent to those skilled in the art and the generic principles herein may be applied to other embodiments. Thus, the present invention is not intended to be limited to the embodiments and examples shown but is to be accorded the widest possible scope in accordance with the features and principles shown and described. To fully appreciate the features of the present invention in greater detail, please refer to FIGS. 1A-1D, 2-4, 5A-5B, 6-8, 9A-9C and 10-12, 13A, 13B, 14, 15A, 15B, 16A, 16B, and 17 in conjunction with the following description.

In the description of the invention herein, it is understood that a word appearing in the singular encompasses its plural counterpart, and a word appearing in the plural encompasses its singular counterpart, unless implicitly or explicitly understood or stated otherwise. Furthermore, it is understood that, for any given component or embodiment described herein, any of the possible candidates or alternatives listed for that component may generally be used individually or in combination with one another, unless implicitly or explicitly understood or stated otherwise. Moreover, it is to be appreciated that the figures, as shown herein, are not necessarily drawn to scale, wherein some of the elements may be drawn merely for clarity of the invention. Also, reference numerals may be repeated among the various figures to show corresponding or analogous elements. Additionally, it will be understood that any list of candidates or alternatives is merely illustrative, not limiting, unless implicitly or explicitly understood or stated otherwise. As used herein, the term "DC", when referring to a voltage applied to one or more electrodes of a mass spectrometer component (such as an ion funnel), does not necessarily imply the imposition of or the existence of an electrical current through those electrodes but is used only to indicate that the referred-to applied voltage either is static or, if non-static, is non-oscillatory and non-periodic. The term "DC" is thus used herein to distinguish the referred-to voltage(s) from applied periodic oscillatory voltages, which themselves may be referred to as either "RF" or "AC" voltages. As used herein, the term "major portion", as used herein, refers to a portion that is greater than fifty percent.

This document includes discussion of various ion conduit structures—referred to as "ion tunnels" and "ion funnels"—that permit ions to migrate through an internal volume of the conduit structure along a longitudinal direction while restricting ions from escaping from the internal volume along transverse or radial dimensions or directions. Because ions are prevented from escaping from the internal volume along certain dimensions or directions, the internal volume is also referred to as a "trapping volume". As used herein, the terms "ion tunnel" and "ion funnel" refer to the combination of the physical conduit structure and the internal volume within which ions migrate longitudinally while being trapped transversely/radially. As used herein, the terms "ion tunnel section" and "ion funnel section" refer to an ion tunnel structure or ion funnel structure, respectively, that is a portion or component of a larger ion transport apparatus which, itself, may comprise one or more ion tunnel and/or ion funnel component portions or sections. As used herein, the term "ion funnel" refers to an ion conduit structure within which the cross-sectional area of the internal volume progressively decreases across the length of its central longitudinal axis or across a portion of the length of a central longitudinal axis of a containing ion transport structure. Likewise, as used herein, the term "ion tunnel" refers to an ion conduit structure that maintains a constant cross-sectional area across its central longitudinal axis or across a portion of a central longitudinal axis of a containing ion transport apparatus.

The use of the terms "ion tunnel" and "ion funnel" are not intended to restrict the cross-sectional shape of the internal volume of the referred to conduit structure to any particular shape. Thus, as the terms are used herein, an ion tunnel or ion funnel may comprise any regular or irregular cross-sectional shape, such as circular, rectangular, etc. If, in cross section, the trapping volume of an ion tunnel has radial symmetry or an n-fold axis of rotational symmetry, where $n \geq 2$, then a central longitudinal axis is taken as the axis of radial or n-fold rotational symmetry. Otherwise, if, in cross section, the trapping volume has a single plane of mirror symmetry, the central longitudinal axis of the ion tunnel is taken as the intersection of the plane of mirror symmetry with the trapping volume. Otherwise, if, in cross section, the trapping volume is asymmetric, the central longitudinal axis is taken as the locus of the centers of mass, taken at all cross sections, of uniform-density laminae having the same shape as the shape of the respective trapping volume cross section.

The discussion in this document make reference to various as axes and planes that are defined with reference to geometric features of physical objects, such as slots, cutouts, apertures, etc. Such various axes and planes are to be understood as extending "to infinity" beyond the feature(s) of physical objects with respect to which they are defined. Accordingly, referred-to intersections of or geometric relationships between such axes and/or planes are not necessarily within the bounds of the defining features or physical objects. Further, as used herein, a statement that a first line or axis is coincident with a second line or axis means that all points of the second line or axis are also points of the first line or axis. Still further, as used herein, a statement that a line or axis is contained within a plane means that all points of the line are also points of the plane.

Figure 3:
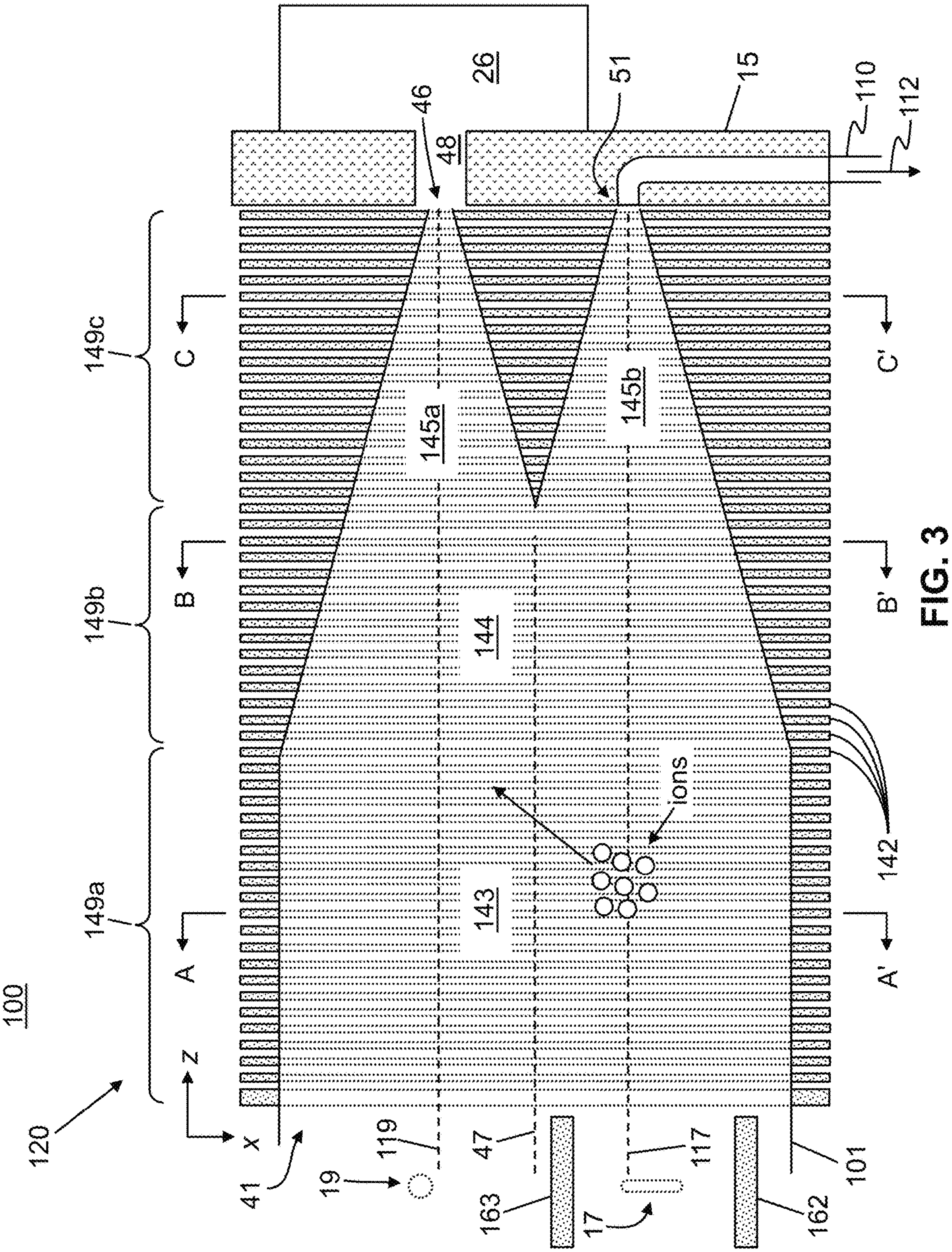
FIG. 3 is a schematic longitudinal cross section of a first embodiment of an ion transport system including an ion transport apparatus in accordance with the present teachings.
Figure 4:
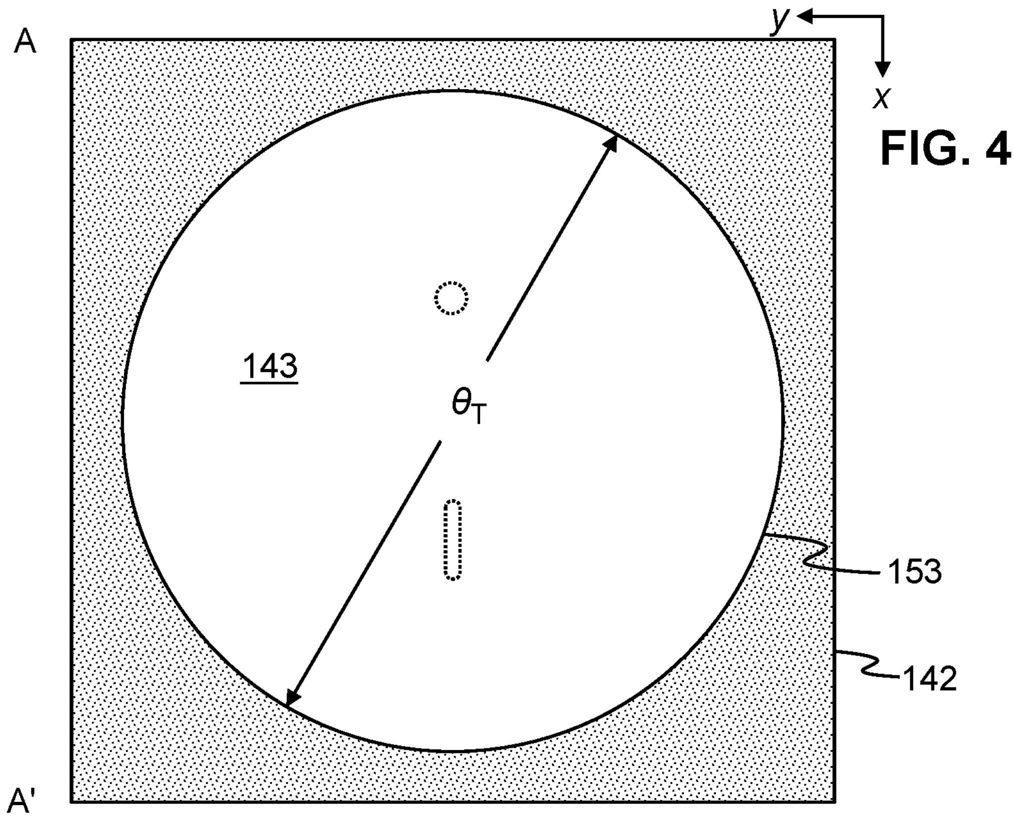
FIG. 4 is a schematic depiction of an electrode plate of the ion transport apparatus of FIG. 3 as viewed on cross-section A-A'.
Figure 5A:
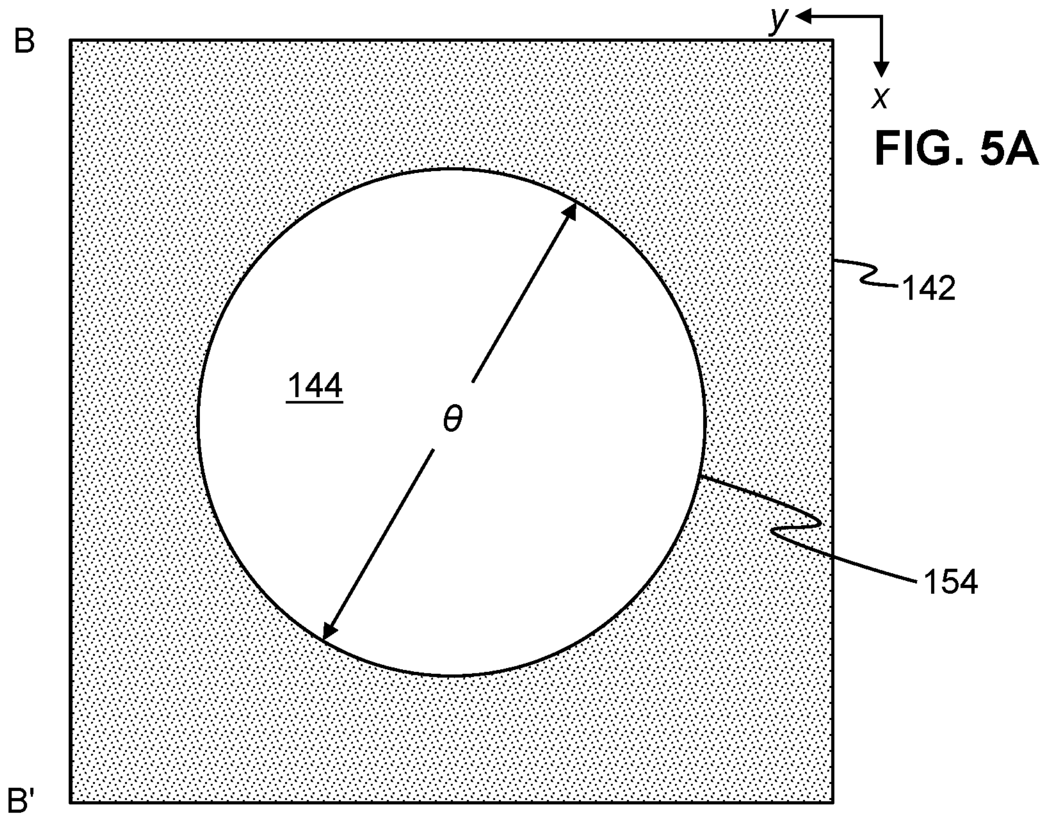
FIG. 5A is a schematic depiction of another electrode plate of the ion transport apparatus of FIG. 3 as viewed on cross-section B-B'.
Figure 6:
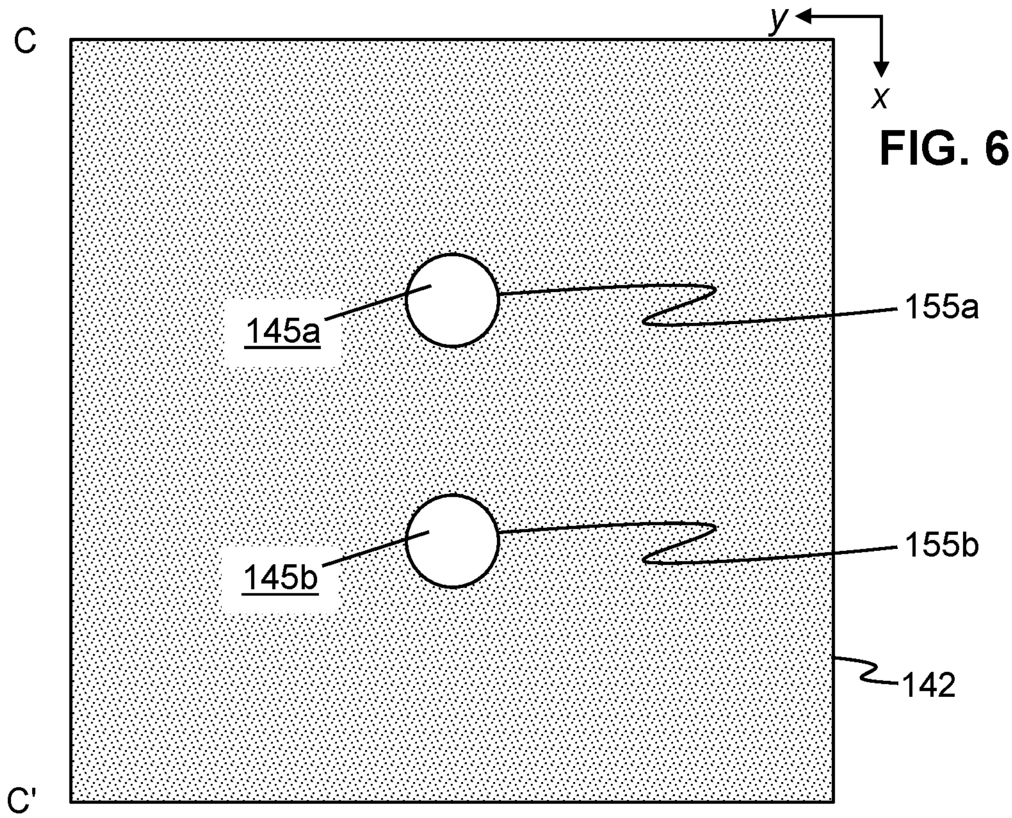
FIG. 6 is a schematic depiction of yet another electrode plate of the ion transport apparatus of FIG. 3 as viewed on cross-section C-C'.

FIG. 3 is a schematic longitudinal cross section of a first embodiment of an ion transport system 100 including an ion transport apparatus 120 in accordance with the present teachings. In FIG. 3 as well as in subsequent drawings, the dashed line 101 schematically depicts the outline of a cross-sectional view of a hollow interior volume of the ion funnel 100, where the cross section is taken to include the apparatus' central longitudinal axis 47. In similarity to conventional ion funnels, the ion funnel 100 comprises a set of stacked parallel plate electrodes 142, each such electrode comprising at least one aperture. In known fashion, Radio Frequency (RF) oscillatory voltage waveforms are applied to the electrode plates, with waveforms of immediately adjacent plates being out of phase by n radians. FIGS. 4, 5A and 6 show schematic depictions of individual plate electrodes located at transverse cross sections A-A', B-B', and C-C', respectively. These figures show the locations of apertures 153, 154, 155*a* and 155*b* which are defined below.

Figure 1C:
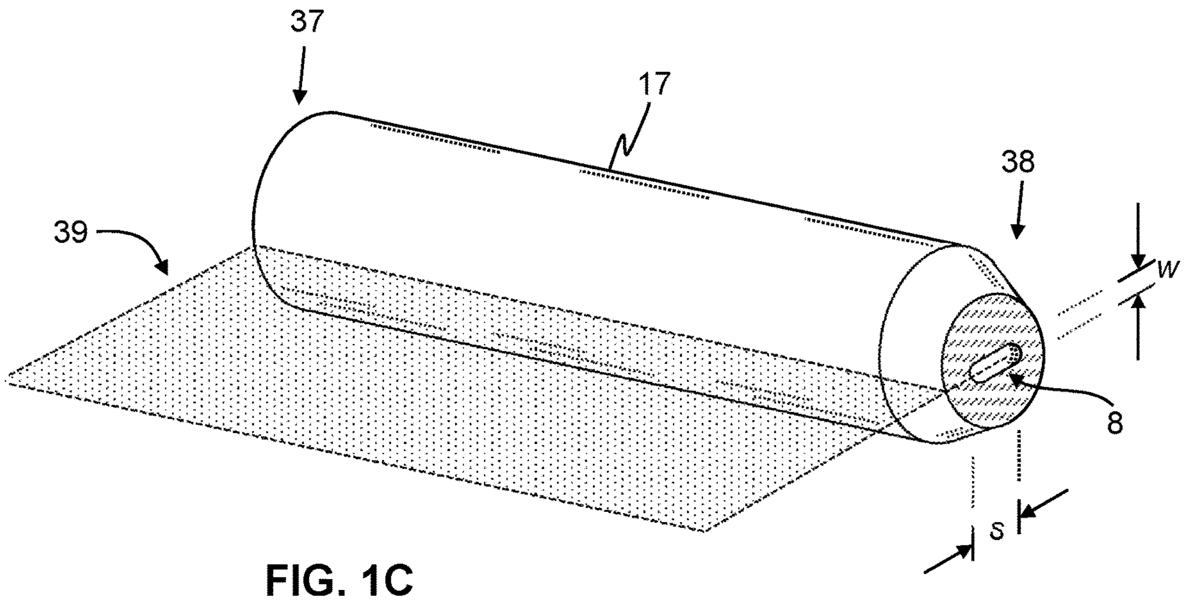
FIG. 1C (Prior Art)
FIG. 1C is a schematic perspective view of a known slotted ion transfer tube as utilized in the ion transport system of FIG. 1B.
Figure 1D:
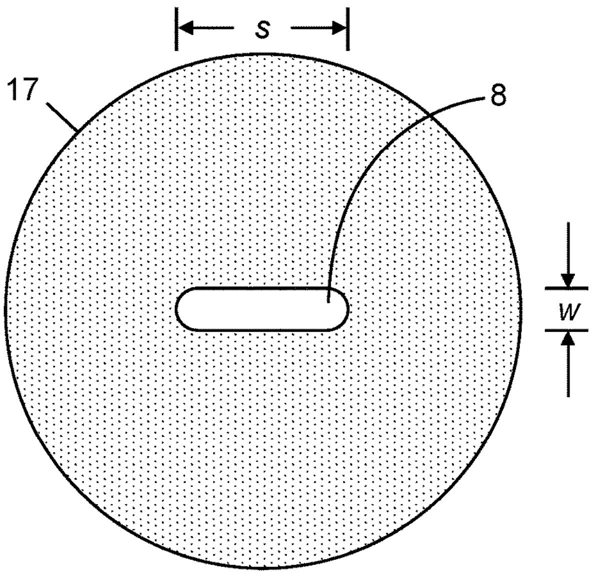
FIG. 1D (Prior Art)
FIG. 1D is a schematic end view of the slotted ion transfer tube of FIG. 1B.
Figure 2:
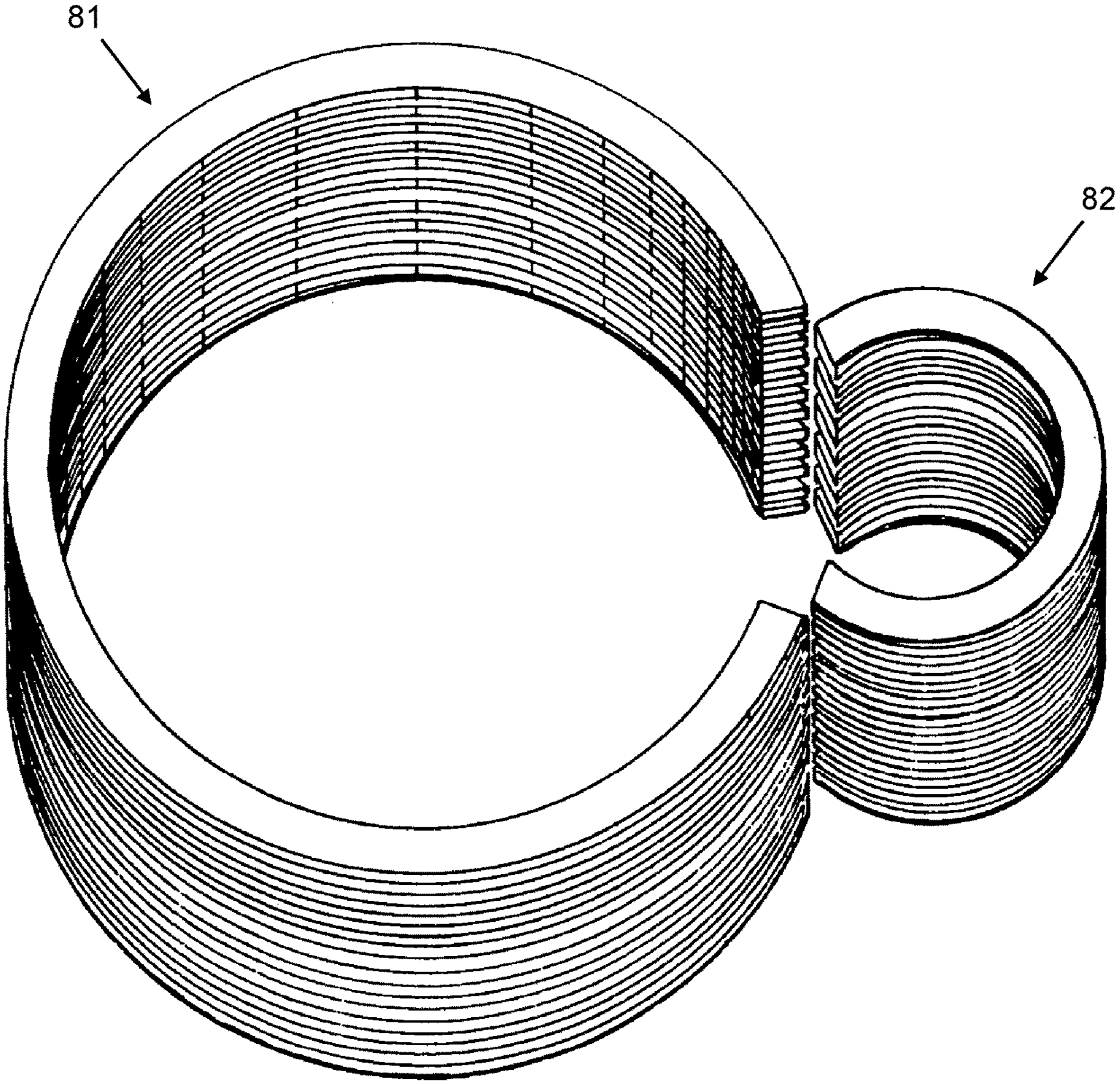
FIG. 2 (Prior Art)
FIG. 2 is a depiction of a known ion transport device comprising conjoined ion guides.

Collectively, the apertures of the plate electrodes 142 define the hollow interior volume of the ion funnel 120 which may be considered as being composed of sub-volumes 143, 144 and 145*a*-145*b*. Gas and/or ions from an ionized sample are delivered into the sub-volume 143 by means of an ion transfer tube 17. The ion transfer tube may comprise a conventional round bore or lumen for transporting the gas and/or ions. Alternatively, as taught in U.S. Pat. No. 8,309,916, which is hereby incorporated herein in its entirety, the ion transfer tube 17 may comprise a slot or may comprises multiple straight or curved slots or may comprise one or more bores or channels having cross sections that comprise one or more obround or slot-shaped lobes. All such bore configurations fulfil the function of transmitting high gas flow and hence more ions, but at the same time providing good heat transfer to ions within the tube that permits efficient desolvation. Optionally, an auxiliary transfer tube 19 may be provided to supply an auxiliary gas flow that optionally includes ions of a calibrant material into the sub-volume 43. The small dotted circle and oval in each of FIGS. 3, 7, 13A, 13*b*, 14 and 15A represent projections, parallel to the axis 47, of the locations of the lumens of the transfer tubes 19 and 17, onto the plane of the depicted electrode plate. In a preferred embodiment, the slotted-bore ion transfer tube 17 has a bore in the form of a single straight slot, as depicted in FIGS. 1C-1D.

As previously described, the ion transfer tube 17 delivers an aerosol into the sub-volume 143 of the ion funnel 120 that includes a mixture of neutral gas molecules, charged solvent droplets and ions derived from a sample. The position of the slotted-bore ion transfer tube 17 is schematically indicated by an elongated slot that indicates that the long dimension of the slot (corresponding to the length, s, depicted in FIG. 1D) is aligned parallel to the x-z plane (i.e., the plane of the printed page) of the funnel 120. Accordingly, the slot plane 39 (see FIG. 1C) of the slotted-bore ion transfer tube 17 is parallel to the plane of the printed drawing page with regard to each of FIGS. 3, 7, 13A, 13*b*, 14 and 15A. The longitudinal axis of the slotted-bore ion transfer tube 17 may be tilted within the slot plane, at an angle $\beta(0 \leq \beta \leq \pi/4)$, relative to the central longitudinal axis 47 of the funnel apparatus 120. The auxiliary transfer tube 19, if present, has a conventional round bore, the axis of which is preferably aligned parallel to the central longitudinal axis 47 of the funnel. The auxiliary transfer tube 19, if present, may be employed to deliver, into the sub-volume 43, either a flow of neutral gas or a flow of a second aerosol comprising gas molecules, charged solvent droplets and ions derived from a calibrant material.

In contrast to conventional ion funnels, the ion funnel 120 comprises two outlet apertures. A first ion outlet aperture 46 receives ions and a small proportion of the inlet gas from funnel sub-volume 145*a* and delivers the ions and gas to intermediate vacuum chamber 26 via an aperture 48 in inter-chamber partition 15. A second outlet aperture 51 receives a greater proportion of the inlet gas as well as some ions from funnel sub-volume 145*b* and exhausts the gas and ions as exhaust flow 112 via a gas exhaust port 110. The exhaust port 110 may be coupled to a vacuum pump.

FIGS. 4, 5A and 6 illustrate how the apertures of plate electrodes 142 vary in progression through the apparatus 120 from its inlet to its outlets. The apertures 153 of the plate electrodes in electrode section 149*a* define the ion tunnel shape of sub-volume 143. Accordingly, the plate electrodes and their apertures in electrode section 149*a* define an ion tunnel section of the apparatus 120. Axis 47, which is a central longitudinal axis of the apparatus 120 is also a central longitudinal axis of the ion tunnel section as well as of the adjacent truncated funnel section of the apparatus, the latter section being defined by the electrodes and apertures of electrode section 149*b*. The apertures of the electrodes of section 149*a* all have the same aperture diameter $\theta O_T$ as shown in FIG. 4. The length of the section 149*a* is sufficient to generate a desired amount of adiabatic cooling of the ions. The diameter $\theta_T$ is sufficiently large to substantially contain the expansion plume of gas and ions that emerges at high velocity from the ion transfer tube 17 as well as from the auxiliary transfer tube 19, if present. However, because of the orientation of the slot of the ion transfer tube 17, within the x-z plane (i.e., the plane of the drawing), the velocity and quantity of gas lateral expansion is greater parallel to the apparatus y-axis (i.e., perpendicular to the plane of the drawing) than are the lateral expansion velocity and quantity parallel to the x-axis (i.e., vertically within the drawing). Whereas gas undergoes expansion, RF voltages applied to the plates in known fashion cause ions to migrate towards and so as to become concentrated near the central axis 47, residing in a pseudopotential well within the sub-volumes 143 and 144. The apertures 154 of the plate electrodes of section 149*b* (FIG. 5A) define the shape of the truncated ion funnel sub-volume 144 of the hollow interior volume. The plate electrodes of section 149*b* have variable diameters, θ, that progressively decrease with increasing distance from the entrance aperture. In similarity to conventional ion funnel apparatuses, the decreasing aperture diameters cause progressive focusing of the flow of ions around the central longitudinal axis 47. Accordingly, ion transport through the apparatus to the mass spectrometer intermediate-vacuum chamber 26 occurs through sub-volumes 143, 144 and 145*a*, which are thus referred to in this document as "ion transport" volumes.

Each electrode plate of section 149*c* comprises two separate apertures, shown as apertures 155*a* and 155*b* in FIG. 6. The collection of apertures 155*a* define the apparatus sub-volume 145*a* and the collection of apertures 155*b* define the sub-volume 145*b*. The centers of the apertures 155*a* are co-axial and define an axis 119 of the funnel-shaped sub-volume 145*a* of apparatus 120. Likewise, the centers of the apertures 155*b* are co-axial and define a central longitudinal axis 119 of the funnel-shaped sub-volume 145*b*. Accordingly, the electrodes of the electrode plate section 149*c*, together with their apertures, define first and second ion funnel sections of the apparatus 120, which correspond to the sub-volumes 145*a* and 145*b*, respectively. Longitudinal funnel-section axes 119 and 117 correspond to the first and second ion funnel sections, respectively. According to the apparatus configuration shown in FIG. 3, the three axes 119, 47 and 117 are all parallel to one another but do not coincide with one another. The axis 119 indicates the orientation of a pseudopotential well within the sub-volume 145*a*; likewise, the axis 117 is the location of a pseudopotential well within the sub-volume 145*b*.

In operation of the apparatus 120, a flow of ions through the apparatus is divided into two unequal flow portions at the boundary between electrode plate sections 149*b* and 149*c*. Most of the flow of ions that is emitted from the ion transfer tube 17 is deflected generally away from the axis 117 by an electric field that is generated by voltages that are applied to repeller electrode 162 and to attractor electrode 163 and/or to the tube 17. This electric field causes most of the emitted ions to flow generally towards the central longitudinal axis 47 and longitudinal funnel-section axes 119. This first portion of the ions passes through the sub-volume 145*a* to ion outlet aperture 46 and a second portion of the ions passing through the sub-volume 145*b* to outlet aperture 51. The first portion of the ions passes into mass spectrometer intermediate-vacuum chamber 26. A second, lesser portion of the emitted ion flux is either neutralized or lost through gas exhaust port 110.

Additionally, the inventors have discovered that, provided that the flow rates from and relative positions of inlets 17, 19 are chosen so as to optimally reduce turbulence, as may be determined from gas dynamics calculations, there is little cross flow of gas between the fluxes from the two transfer tubes. In other words, under such conditions, most of the gas flux, $Q_1$, emitted from the slotted-bore ion transfer tube 17 does not cross the axis 47 into sub-volume 145*a* and, likewise, most of the smaller gas flux, $Q_2$, emitted from the auxiliary transfer tube 19, if present and utilized, does not cross into the sub-volume 145*b*. Thus, most of the gas and droplets emitted from the ion transfer tube 17 are exhausted from the apparatus, either through gas exhaust port 110 or by escape through the gaps between the plate electrodes. The smaller gas flow from the auxiliary transfer tube 19 is either exhausted from the apparatus through gaps between plates or else remains as a small residual gas flow that propels the ions through the ion outlet aperture 46.

The vertical orientation of the dotted oval representing the slot of the slotted ion transfer tube 17 in FIG. 3 and other drawings is a representation that the long dimension of the slot is oriented parallel to the denoted x-axis. Such an orientation is advantageous because the velocity of gas emitted from the slot is greater parallel to the y-axis (i.e., into and out of the page of the drawing of FIG. 3) than is the velocity parallel to the x-axis. Thus, the depicted slot orientation aids in directing most of the gas flow away from the ion outlet aperture 46 in the y-direction, meanwhile allowing a reduction in the distance between the ion transfer tube and the aperture 46 along the x-direction. More generally, the slotted-bore ion transfer tube 17 may be advantageously oriented such that the central longitudinal axis 47 of the apparatus is contained within the slot plane 39 of the slotted-bore ion transfer tube 17.

In operation of the funnel 120, sample-derived ions, together with un-ionized gas and charged droplets, are emitted into the sub-volume 143 from the slotted-bore ion transfer tube 17. As taught in U.S. Pat. No. 9,761,427, gas jet expansion emerging from the slotted-bore ion transfer tube 17 into the funnel apparatus is anisotropic, with greater gas expansion and velocity occurring perpendicular to the slot plane 39. Within the funnel apparatus 120, the slot of the ion transfer tube 17 is oriented parallel to the x-axis, as indicated on the drawing. Accordingly, most of the expansion of gas that is inlet to the sub-volume 143 from the ion transfer tube is perpendicular to the plane of the drawing and only a minor proportion of the gas expansion occurs parallel to the x-axis. Therefore, most neutral gas molecules and residual droplets follow the general gas flow into sub-volume 145*b* and are exhausted from the apparatus at outlet aperture 51. At the same time, ions are urged by DC fields to migrate towards axes 47, 119 and beyond towards electrodes 149*c*. Thus, it is preferable that the central longitudinal axis 47 is contained within the slot plane 39 of the slotted-bore ion transfer tube 17. In this fashion, ions may migrate from the outlet of the slotted-bore ion transfer tube 17 towards the pseudopotential well near electrodes 149*c* with minimal deflection caused by gas flow. Thus, the probability that ions will enter the sub-volume 145*a* is much higher than the probability that the ions will enter the sub-volume 145*b*. Accordingly, employment of the funnel apparatus 120 significantly reduces the proportion of neutral molecules relative to ions that are transferred into the downstream intermediate-vacuum chamber 26.

During operation of the funnel apparatus 120, the auxiliary transfer tube 19, if present, may be employed according to one of three different auxiliary tube operational modes: an inactive mode in which no gas or ions are inlet to the sub-volume 143; a calibration mode in which a flow of calibrant ions and other particles are introduced into the sub-volume 143 from a secondary electrospray ion source; and an auxiliary gas flow mode in which a flow of neutral gas molecules only is introduced into the sub-volume 43. As noted above, gas dynamics calculations indicate that, in all such operational modes, a large proportion of the gas flow emitted from the slotted-bore ion transfer tube 17 is exhausted through the gas exhaust port 110. Neutral gas molecules and residual droplets are thereby advantageously prevented from passing into the intermediate-vacuum chamber 26. However, the calculations also indicate that, when the auxiliary transfer tube 19 is inactive during operation of the system 100, a significant amount of gas turbulence may develop in the portion of the hollow interior volume that is disposed between the auxiliary transfer tube 19 and the ion outlet aperture 46. This turbulence is believed to interfere with the migration of ions out into the intermediate-vacuum chamber through the ion outlet aperture 46 when the auxiliary transfer tube 19 is inactive. The gas dynamics calculations indicate that this turbulence is suppressed by a relatively small auxiliary gas flow that is provided by the auxiliary transfer tube 19 when it is operated in either the calibration mode or the auxiliary gas flow mode.

Figure 8:
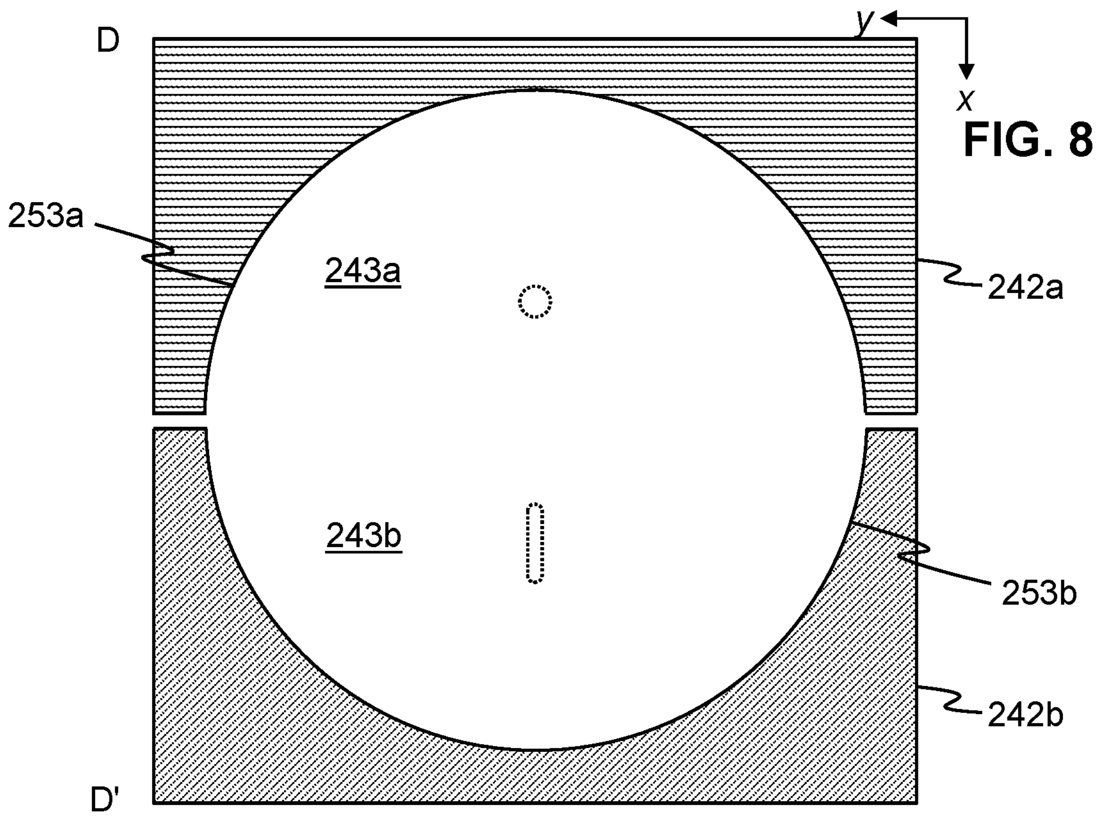
FIG. 8 is a schematic depiction of a pair of electrode plates of the ion transport apparatus of FIG. 7 as viewed on cross-section D-D'.
Figure 9A:
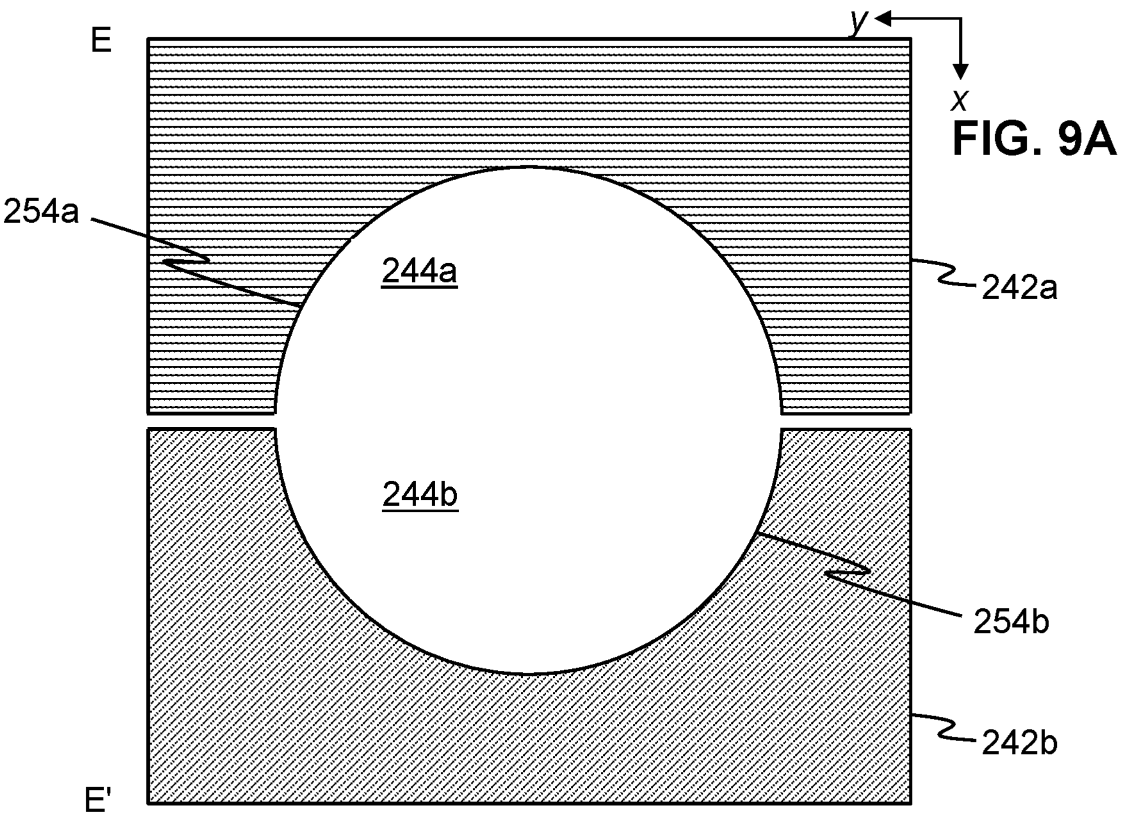
FIG. 9A is a schematic depiction of another pair of electrode plates of the ion transport apparatus of FIG. 7 as viewed on cross-section E-E'.
Figure 10:
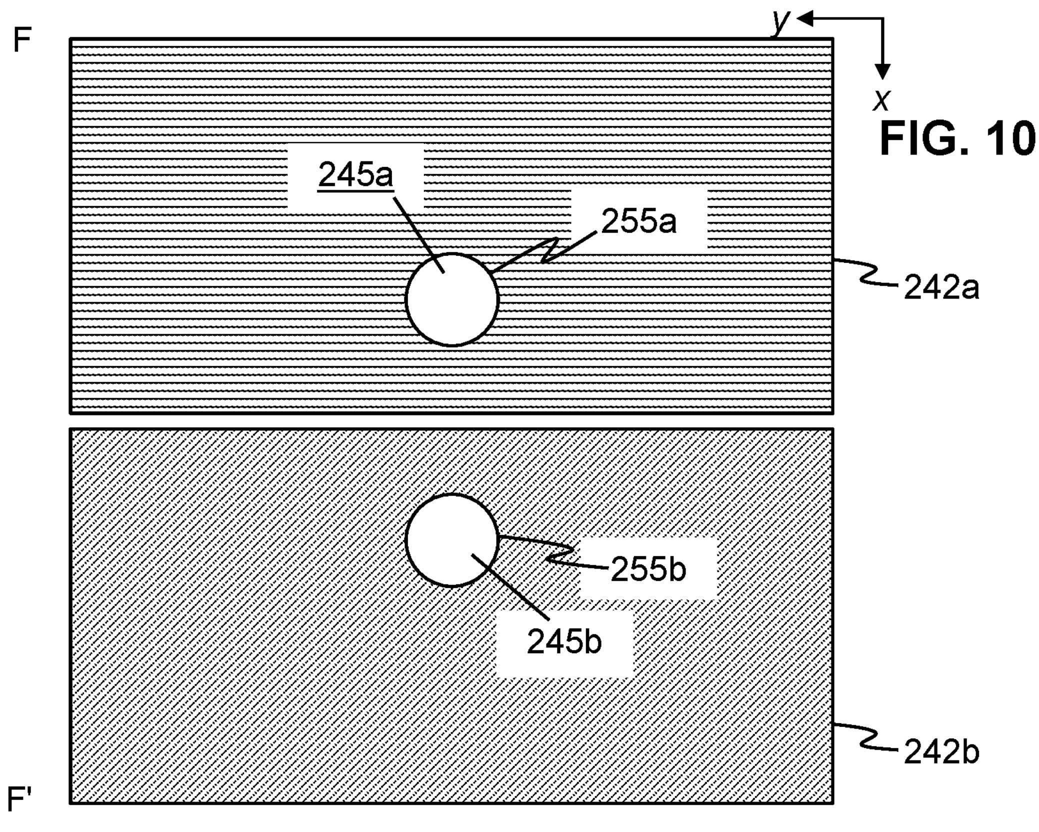
FIG. 10 is a schematic depiction of yet another pair of electrode plates of the ion transport apparatus of FIG. 7 as viewed on cross-section F-F'.
Figure 7:
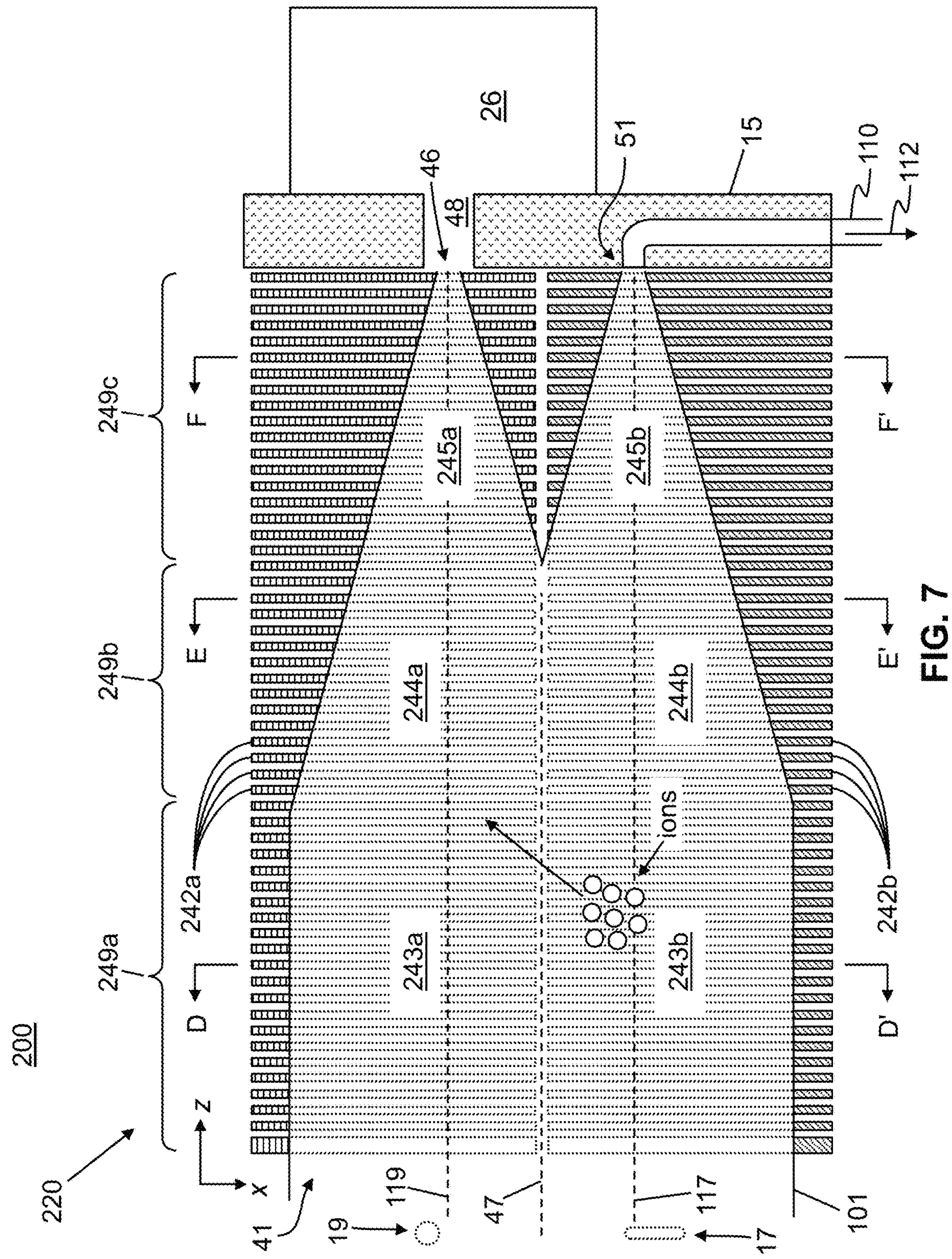
FIG. 7 is a schematic longitudinal cross section of a second ion transport system including an ion transport apparatus in accordance with the present teachings.

FIG. 7 is a schematic longitudinal cross section of a second ion transport system 200 including an ion transport apparatus 220 in accordance with the present teachings. The ion transport apparatus 220 of FIG. 7 differs from the ion transport apparatus 120 of FIG. 3 in that each individual plate electrode 142 of the apparatus 120 is replaced, in the apparatus 220, by a pair of half-electrode plates 242*a*, 242*b* that are preferably co-planar with one another. FIGS. 8, 9A and 10 show schematic depictions of such plate-electrode pairs located at cross sections D-D', E-E', and F-F', respectively. The cross-section of the hollow interior volume of the ion transport apparatus 220, as taken along a plane the incudes the central axis 47 and as depicted by dashed line 101, is essentially identical to the cross section depicted in FIG. 3. However, as shown in FIGS. 8, 9A and 10, the hollow interior volume is partially defined by cutout surfaces 253*a*, 254*a* and aperture surface 255*a* of electrodes 242*a* and partially defined by cutout surfaces 253*b*, 254*b* and aperture surface 255*b* of electrodes 242*b*. These surfaces define an ion tunnel electrode section 249*a* of the electrode pairs, a truncated ion funnel electrode section 249*b* of the electrode pairs and a third section 249*c* of the electrode pairs that corresponds to first and second ion funnel sections of the apparatus 220, the first of which outlets ions and a small proportion of the inlet gas to ion outlet aperture 46 and the second of which outlets a major portion of the inlet gas and a lesser quantity of ions to second outlet aperture 51.

As shown in FIG. 8, the cutout surfaces 253*a* and 253*b* of electrode pairs within electrode section 249*a* oppose one another across the position of the central axis 47, with each of the two opposing surfaces 253*a*, 253*b* outlining and defining a cutout within an edge of the respective plate electrode. Each cutout surface approximates a semicircle and the two semicircles together define an approximately circular aperture having a constant apparent diameter of $\theta_T$ throughout the ion tunnel section of the apparatus. Likewise, as shown in FIG. 9A, the cutout surfaces 254*a* and 254*b* of electrode pairs within the truncated funnel electrode section 249*b* oppose one another across the position of the central axis 47, with each of the two opposing surfaces approximating a semicircle and the two semicircles together defining an approximately circular aperture having a variable apparent diameter of 0. Within the section 249*c*, the aperture surfaces 255*a* and the surfaces 255*b* (FIG. 10) define separate circular apertures within electrodes 242*a* and 242*b*, respectively. Taken together, the three sections of the two sets of electrodes define six sub-volumes of the hollow interior of the apparatus 220. As denoted in FIG. 7, these are referred to as sub-volumes 243*a*-243*b*, 244*a*-244*b* and 245*a*-245*b*.

In operation of the system 200, the members of each pair of "half" electrodes are preferably supplied with an identical RF voltage amplitude and phase. Further, the RF phase supplied to each electrode pair is out of phase with the RF phase supplied to each immediately adjacent pair of electrodes. Thus, a pseudopotential well is generated within the apparatus 220 in the same manner that a similar pseudopotential well is generated in the apparatus 120 of FIG. 3. However, in contrast to the operation of the apparatus 120, the operation of the apparatus 220 includes providing a constant DC potential difference between the electrodes 242*a* and the electrodes 242*b*. The sign of the DC potential difference is such as to pull sample-derived ions emitted from the slotted ion transfer tube 17 out of the sub-volumes 243*b* and 245*b* and into the sub-volumes 243*a*, 244*a* and 245*a*. These sample-derived ions then exit the apparatus 220 through ion outlet aperture 46 and are subsequently transferred into intermediate-vacuum chamber 26. The provision of the DC potential difference, which is made possible by the replacement of each electrode plate 142 (e.g., as in FIG. 3) by a pair of half-electrode plates 242*a*, 242*b*, assists in urging the migration of sample ions towards and through the exit port 46. Accordingly, it may be seen that sub-volumes 243*b*, 243*a*, 244*a* and 245*a* are ion transport volumes through the apparatus 220.

At the same time that ions are being transported towards and through the exit port 46, the flow 112 of neutral gas molecules and residual droplets is predominantly directed out of the apparatus through gas exhaust port 110 or between the gaps in the electrode plates as described above with regard to the apparatus 120. Because the opposing electrode surfaces of electrode pairs that define the sub-volumes 243*a*-243*b* and 244*a*-244*b* complement one another (i.e., by approximating a set of circular apertures) no pseudopotential barrier (which would otherwise be centered about the central longitudinal axis 47) is created between the electrodes 242*a* and 242*b*. Because a fully-enclosed pseudopotential barrier between the electrodes 242*a* and 242*b* segments does not exist along the entire axial length of the device, each such set of electrodes 242*a*, 242*b* of the apparatus 220 cannot function as an independently-controllable ion guide as is described, for instance, in U.S. Pat. No. 8,581,181. The auxiliary transfer tube 19, if present, may be employed according to any one of the "inactive", "calibration" and "auxiliary gas flow" operational modes with results similar to those describe with regard to the apparatus 120. In particular, the latter two modes are preferred.

Figure 11:
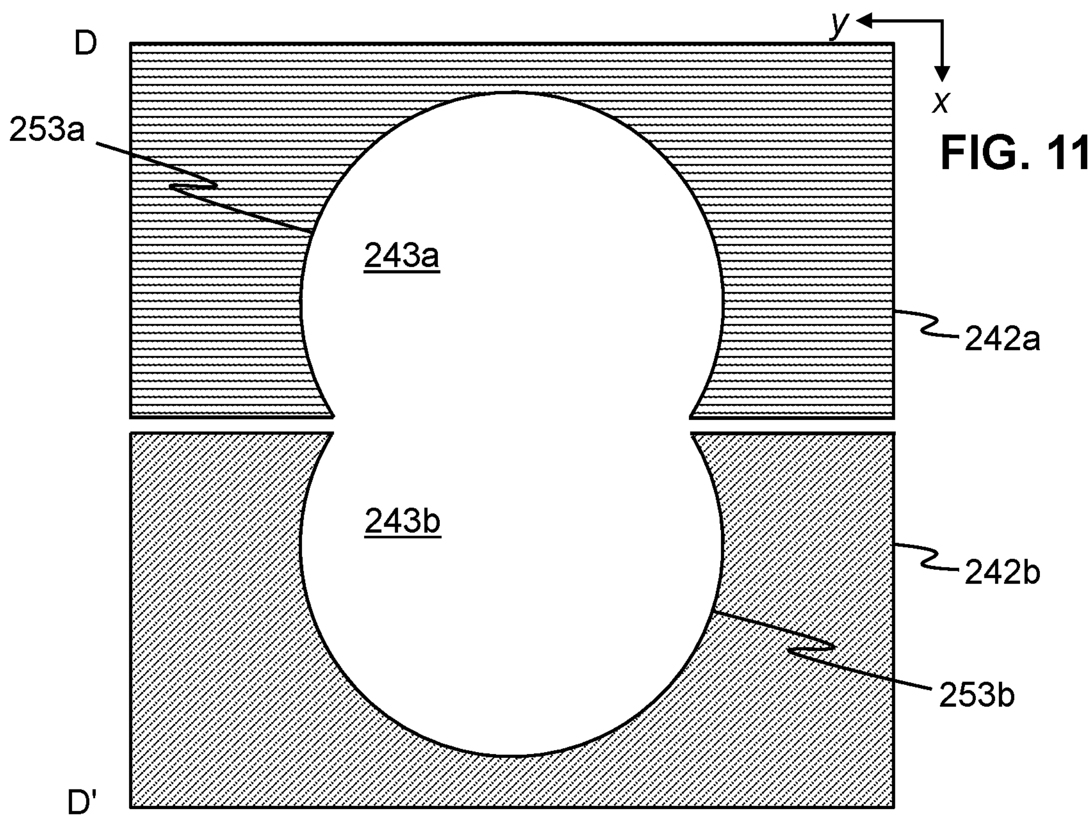
FIG. 11 is a schematic depiction of a pair of electrode plates of an ion transport apparatus that is a variant of the ion transport apparatus of FIG. 7.
Figure 12:
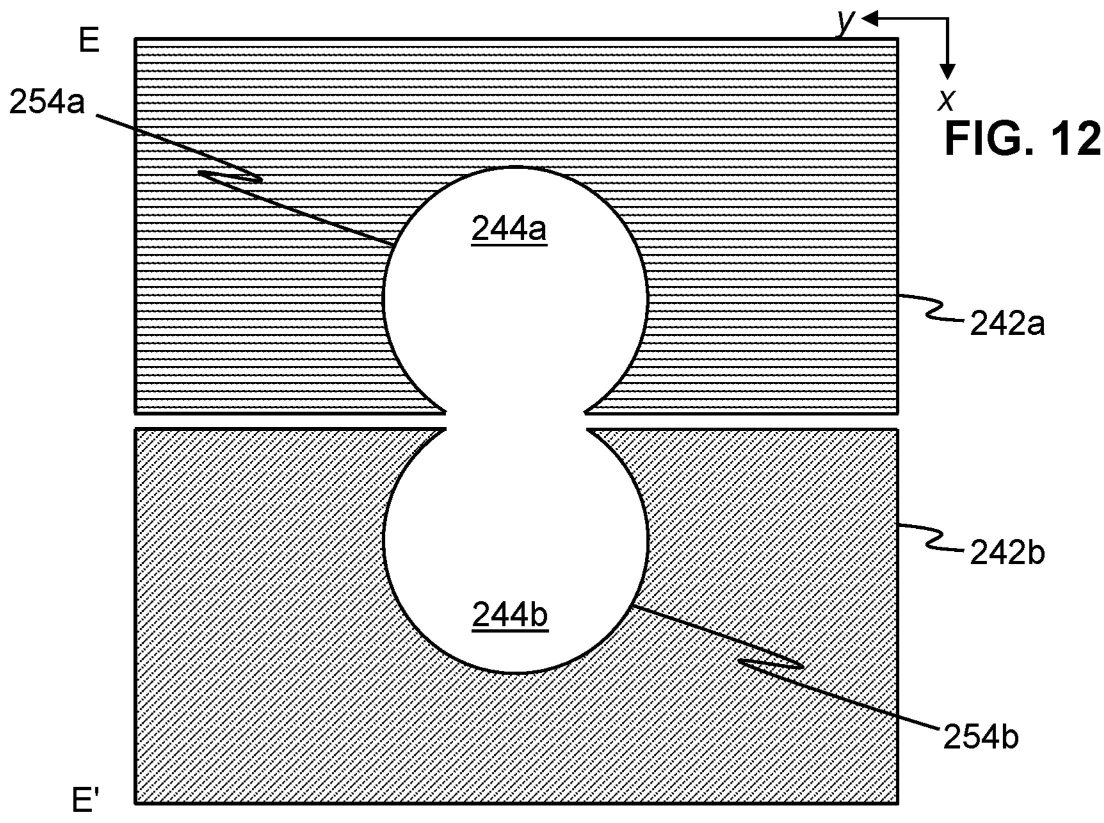
FIG. 12 is a schematic depiction of another pair of electrode plates of the ion transport apparatus, as viewed on cross-section D-D', that is a variant of the ion transport apparatus of FIG. 7.

FIGS. 11-12 are schematic depictions, taken at the cross-sectional locations D-D' and E-E', of plate electrode pairs of a variant embodiment of an ion transport apparatus in accordance with the present teachings. The variant embodiment is generally similar to the apparatus 220 shown in FIG. 7. However, in cross section, the cutout-defining surfaces, 253*a*-253*b* and 254*a*-254*b* of each pair of electrodes of the variant embodiment are portions of separate circles (e.g., FIGS. 11-12) instead of portions of a single circle centered on the central longitudinal axis 47 (e.g., FIGS. 8-9A).

Figure 13A:
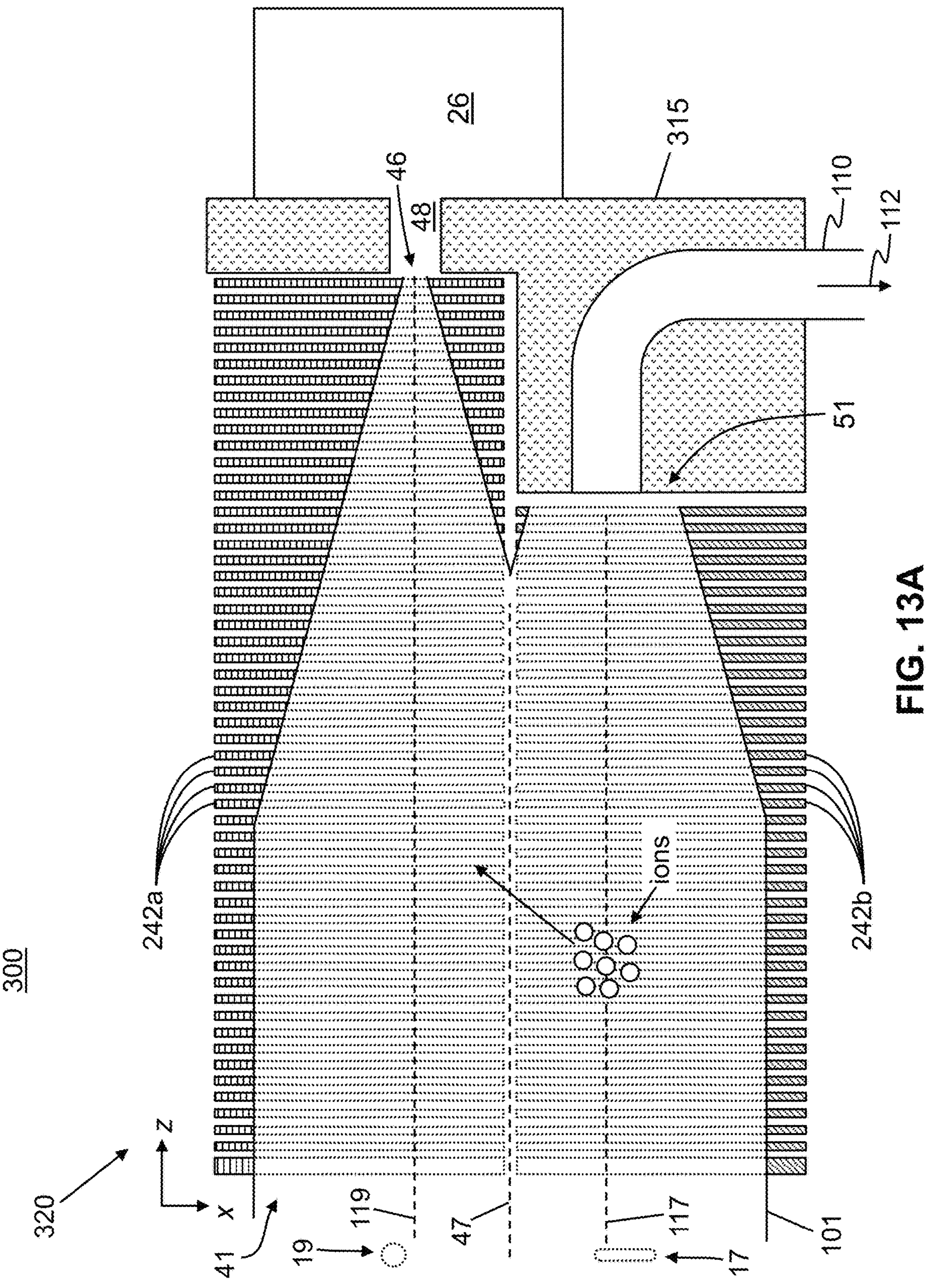
FIG. 13A is a schematic longitudinal cross section of a third ion transport system including an ion transport apparatus in accordance with the present teachings.
Figure 13B:
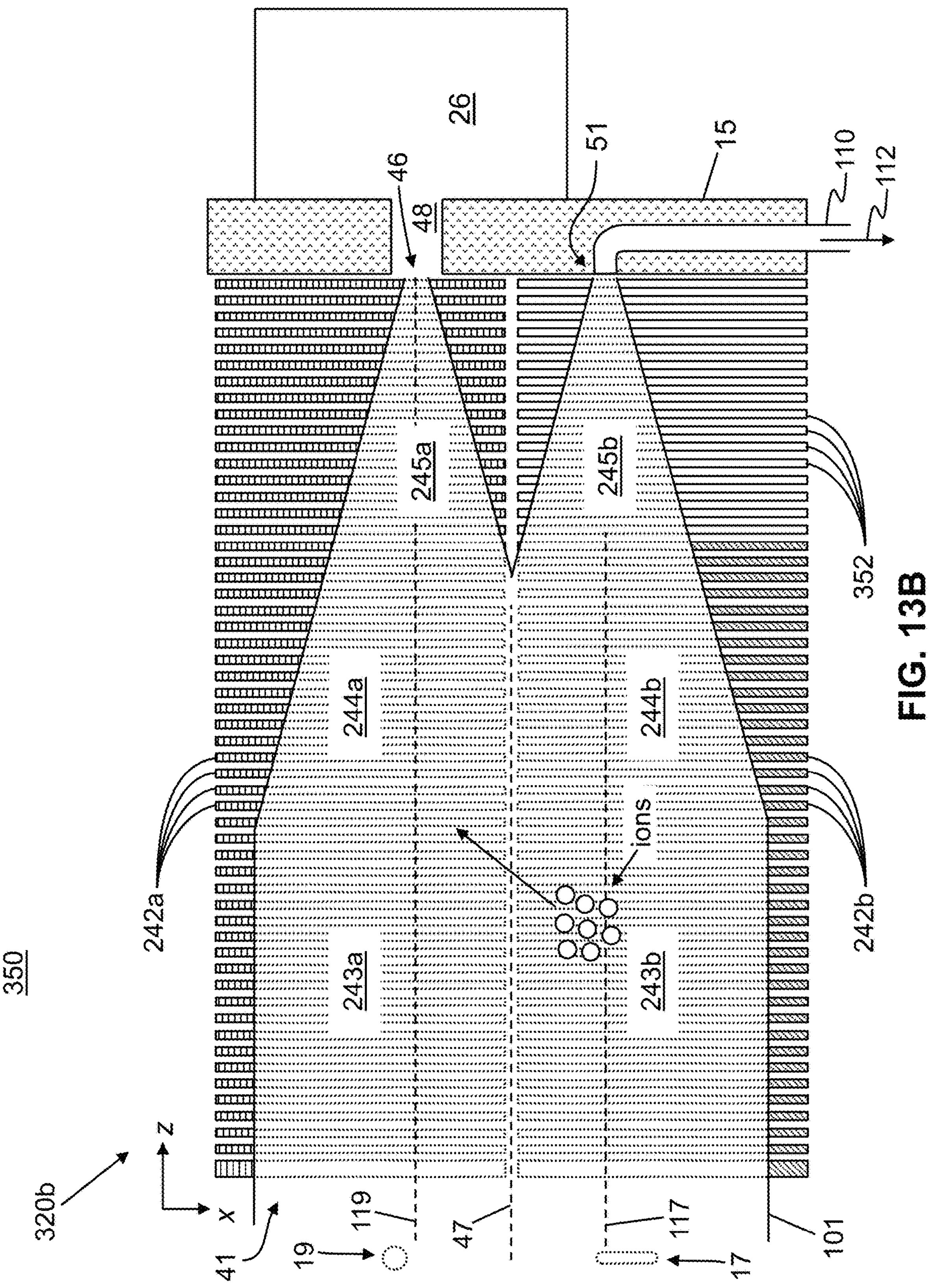
FIG. 13B is a schematic longitudinal cross section of a fourth ion transport system including an ion transport apparatus in accordance with the present teachings.

FIG. 13A is a longitudinal cross section of another embodiment of an ion transport system 300 including an ion transport apparatus 320 in accordance with the present teachings. The ion transport apparatus 320 is generally similar to the ion transport system 200 (FIG. 7) except that all or a portion of the electrodes 242*b* whose apertures would otherwise define the sub-volume 245*b* are replaced by an enlargement of the gas exhaust port 110 and/or deeper extension of the exhaust port 110 into the interior of the funnel apparatus. The depiction of the exhaust port in FIG. 13A is highly schematic and other shapes may be envisioned for the purpose of efficiently purging the gas flow from the funnel. For example, the interior of the gas collection end of the gas exhaust port 110 may be funnel shaped, thereby replacing the defining boundaries of the sub-volume 245*b*. The enlarged exhaust port may be accompanied by an enlarged or re-configured inter-chamber partition 315 that replaces the conventional partition 15. Many or all of the replaced electrodes may be un-necessary since ion guiding is generally not required for any ions that flow into the sub-volume 245*b*. Alternatively, the configuration depicted in FIG. 13B as ion transport system 350 may be adopted. The ion transport apparatus 320*b* of the system 350 comprises the same physical structure as the ion transport system 200 of FIG. 7. The ion transport apparatus 320*b* differs from the ion transport system 200 only through the replacement of all or a portion of the electrodes 242*b* that define the sub-volume 245*b* by apertured plates 352. No RF voltages are provided to the apertured plates 352. However, a DC offset voltage may be applied to the apertured plates 352 in order to prevent loss of ions through the gas exhaust port.

Figure 14:
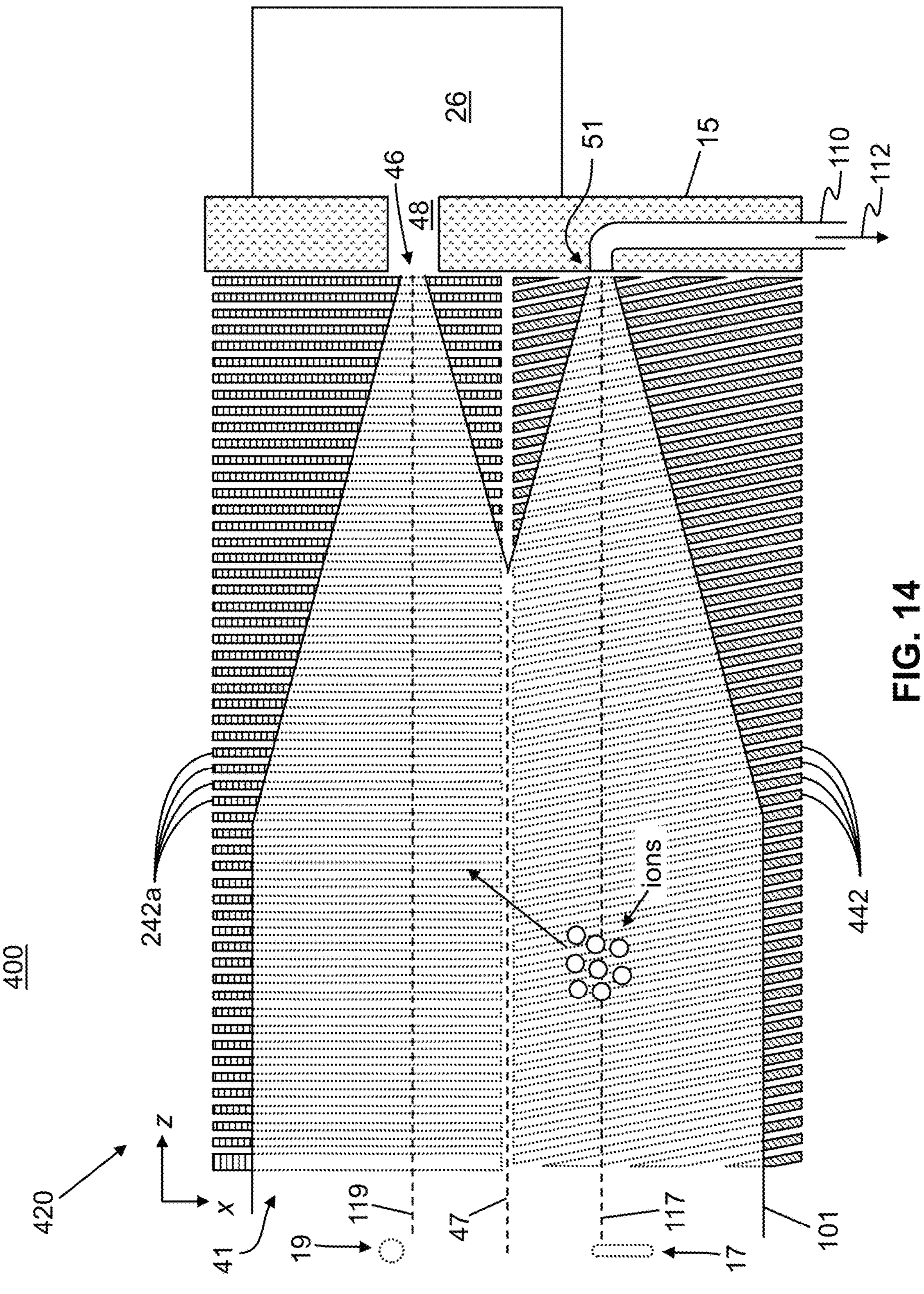
FIG. 14 is a schematic longitudinal cross section of a fifth ion transport system including an ion transport apparatus in accordance with the present teachings.

FIG. 14 is a schematic longitudinal cross section of another embodiment of an ion transport system 400 including an ion transport apparatus 420 in accordance with the present teachings. The ion transport apparatus 420 is generally similar to the ion transport system 200 (FIG. 7) except that the set of electrodes 242*b* are replaced by a set of electrodes 442 that are oriented differently from the orientation of the electrodes 242*b*. Although the individual electrodes 242*b* and 442 are all planar in form, the electrodes 242*b* (as well as the electrodes 242*a*) are oriented (see FIG. 7) with their planes (e.g., the planes of the faces of the plate electrodes) substantially perpendicular to the central longitudinal axis 47. However, in the apparatus 420, each electrode 442 is oriented with the normal to its plane disposed at an angle to the axis 47. The slant angle is provided in a direction such that the flow of gas and/or residual droplets emitted from the slotted ion transfer tube 17 are directed away from the ion outlet aperture 46. The slant angle of the electrodes thus aids in the separation of gas and/or residual droplets from sample-derived ions, which are urged away from the flow of gas by the DC potential difference applied between the electrodes 242*a* and the electrodes 442. In a variant embodiment of the apparatus 420, a portion of the electrodes 442 may be replaced by an enlargement of the gas exhaust port 110 and/or deeper extension of the exhaust port into the interior of the funnel apparatus, as depicted in FIG. 13A.

Figure 15A:
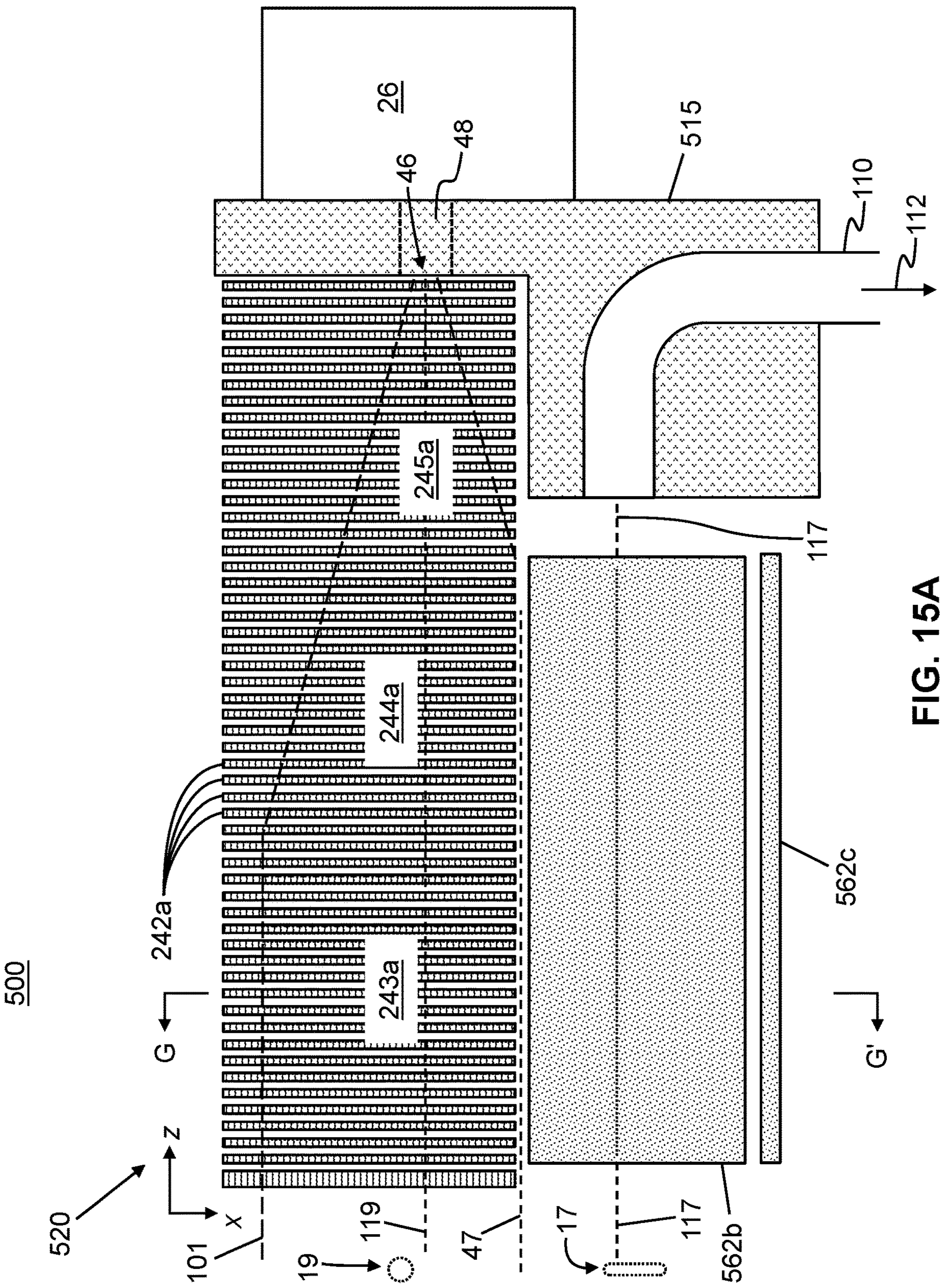
FIG. 15A is a schematic longitudinal cross section of a sixth ion transport system including an ion transport apparatus in accordance with the present teachings.
Figure 15B:
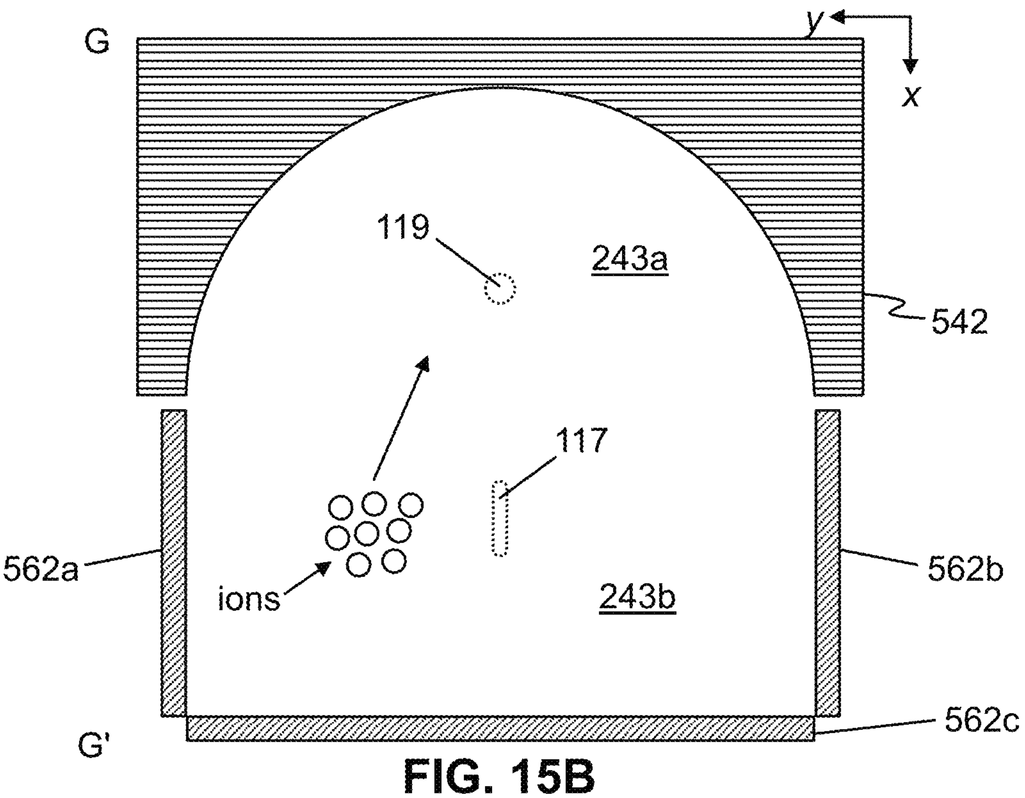
FIG. 15B is a schematic transverse cross section of the ion transport apparatus of FIG. 15A, as viewed on cross-section G-G'.

FIGS. 15A and FIG. 15B are schematic longitudinal and transverse cross sections, respectively, of another embodiment of an ion transport system 500 including an ion transport apparatus 520 in accordance with the present teachings. The view shown in FIG. 15B is taken at the cross-sectional location G-G'. Although the ion transport apparatus 520 includes the set of electrodes 242*a* of the system 200 (FIG. 7), the second set of electrodes 242*b* are replaced by one or more repeller electrodes, depicted as the three repeller electrodes 562*a*, 562*b* and 562*c*. Accordingly, in contrast to the other embodiments of herein-taught ion transport apparatuses, the apertures of the electrodes 242*a* of the apparatus 520 define only a single ion funnel section that corresponds to the funnel-shaped sub-volume 245*a*. The funnel-shaped sub-volume 245*b* of the apparatus 350 (FIG. 13B) is replaced, in the apparatus 520, by a channeled structure 515, which may be a portion of a wall or housing, that comprises the gas exhaust port 110.

Although three repeller electrode plates are shown in FIG. 15B, it should be kept in mind that that the entire electrode depicted in FIGS. 15A-15B could alternatively be formed of a single integrated piece. Although the depicted repeller electrodes are illustrated in the form of flat plates, it should be kept in mind that the one or more repeller electrodes may comprise curved surfaces of various shapes such as, without limitation, segments or arcs of tubes. In operation of the apparatus 520, a constant DC electrical potential difference is applied between the repeller electrodes and the set of plate electrodes 242*a*. The shape of the repeller electrode(s) and the sign of the DC potential difference are such that sample-derived ions are urged away from the repeller electrodes 562*a*-562*c* and towards the sub-volumes 243*a* and 244*a*. As shown in FIG. 15B, the sub-volume 243*b*, which receives ions and gas from the ion transfer tube 17, is defined within the confines of the repeller electrodes 562*a*-562*c*.

Taken together, the ion-repulsive potential applied to the repeller electrodes of the apparatus 520 and the ion-repulsive pseudopotential that is caused by application of alternately out-of-phase RF voltage waveforms to the electrodes 242*a* combine to create a pseudopotential well within the sub-volumes 243*a*, 244*a*. This pseudopotential well is generally near to the funnel axis 119 within the sub-volumes 243*a*, 244*a*. However, the pseudopotential may not be precisely centered about the funnel axis 119 as a result of the cross-sectional asymmetry of the apparatus 520 (e.g., see FIG. 15B). For good results, it is preferable that the slotted-bore ion transfer tube 17 is oriented such that ions may migrate from the outlet of the ion transfer tube and towards the pseudopotential well that is near the funnel axis 119 with minimal disturbance caused by gas flow. To achieve this goal, it is advantageous to orient the slotted-bore ion transfer tube 17 such that the funnel axis 119 is contained within the slot plane 39 of the ion transfer tube. Such a configuration causes most ions to be directed by an applied DC field away from the exhaust port and generally towards the towards the sub-volumes 243*a*, 244*a*, 245*a* and the ion outlet aperture 46. Accordingly, sub-volumes 243*b*, 243*a*, 244*a*, 245*a* are ion transport volumes within the apparatus 520. At the same time that ions are being transported to the ion outlet aperture 46 through the ion transport volumes, the asymmetric jet expansion of gas that emanates from the slotted ion transfer tube 17 causes most neutral gas molecules and residual droplets to be directed towards the exhaust port 110. The asymmetry of the jet expansion permits the width of the repeller electrode or electrode structure to be greater than the distance of this electrode or electrode structure from the jet axis 17*a*. As a result, the required DC electrical potential difference between the repeller electrodes and the set of electrodes 242*a* advantageously remains well below the 300-350 V threshold for initiation of undesired Paschen discharge.

Figure 16B:
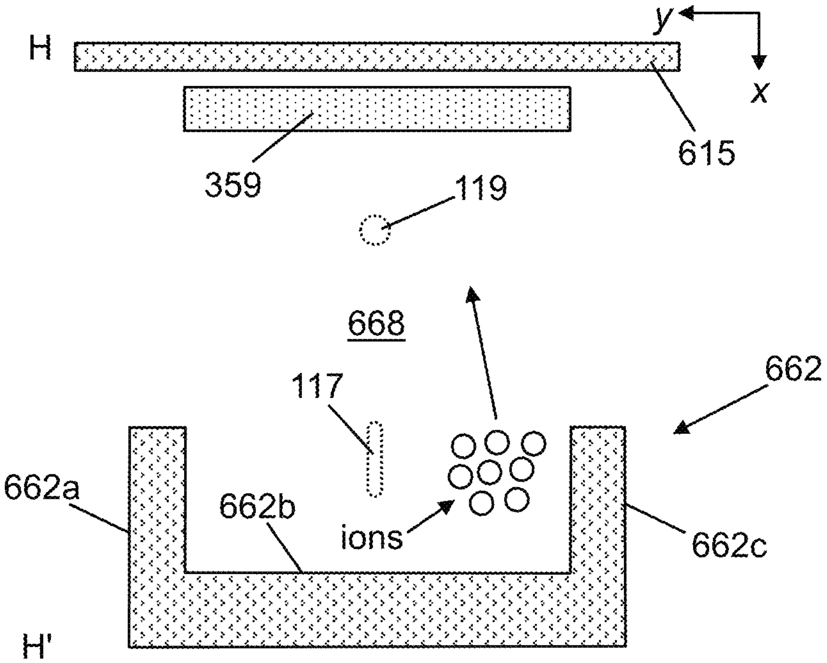
FIG. 16B is a schematic transverse cross section of the ion transport apparatus of FIG. 16A, as viewed on cross-section H-H'.
Figure 16A:
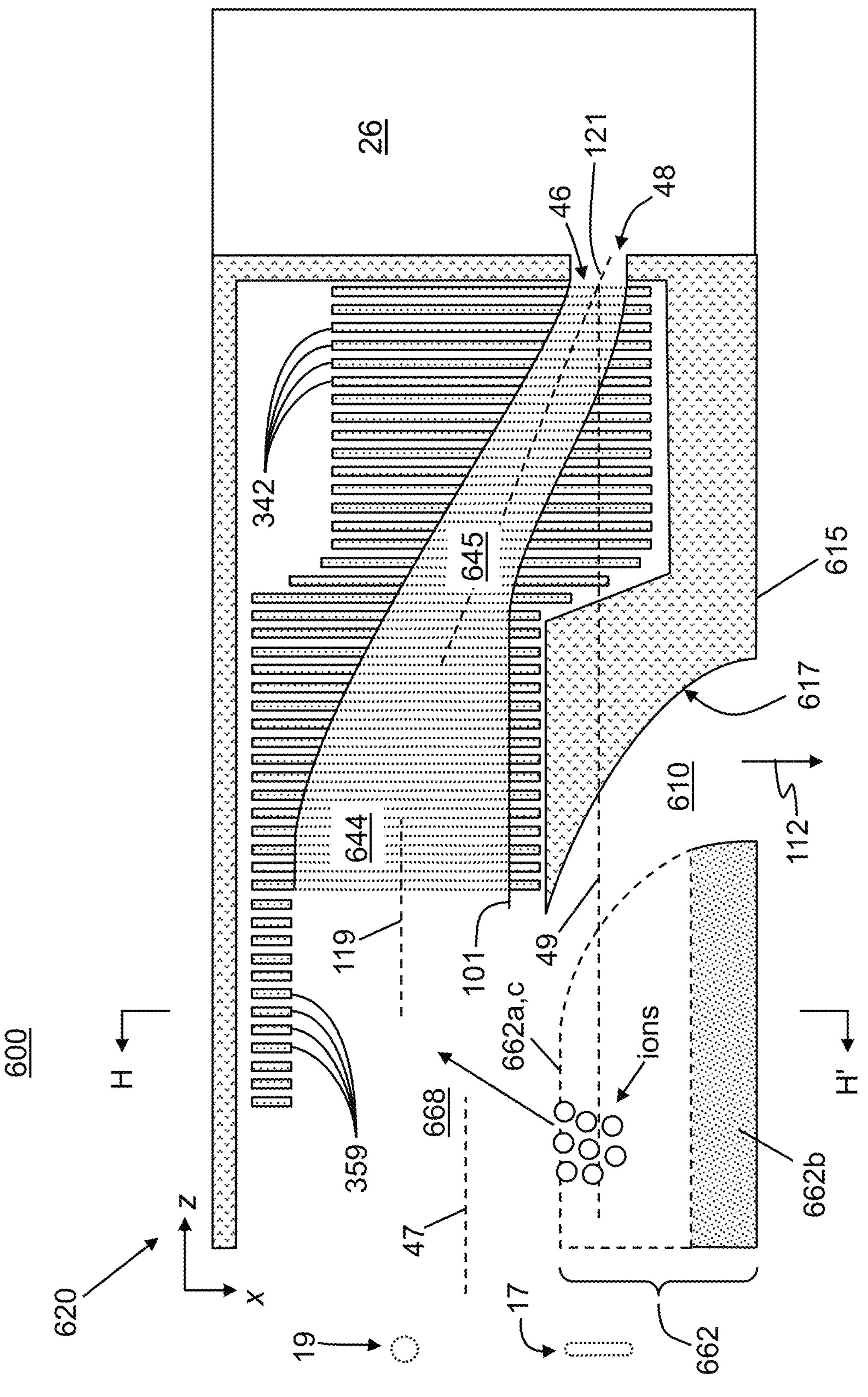
FIG. 16A is a schematic longitudinal cross section of a seventh ion transport system including an ion transport apparatus in accordance with the present teachings.

FIGS. 16A and 16B are a schematic side-elevational view and a schematic transverse cross section, respectively, of another embodiment of another ion transport system 600 including an ion transport apparatus 620 in accordance with the present teachings. The ion transport apparatus 620 is a modified and simplified version of the funnel apparatus 520 in which the exhaust port 110 is replaced by a gas exhaust channel 610 that is defined by a gap between a repeller electrode assembly 662 and a gas diverter surface 617 of a gas diverter structure 615, the latter of which may comprise a portion of a wall or housing of the apparatus. The repeller electrode assembly 662 may comprise a box-like structure as depicted in the transverse cross-sectional view of the system provided in FIG. 16B. As shown in FIG. 16B, the repeller electrode assembly 662 may be comprise two wall sections 662*a*, 662*b* and a basal section 662*b* that define an internal gas channel that guides gas and droplets that emerge from the slotted-bore ion transfer tube 17 to the exhaust channel 610. The wall and basal sections may be formed as a single integral piece, as shown in FIG. 16B or, alternatively, may be separate from one another.

In similarity to other ion transport apparatuses described herein, the funnel apparatus 620 comprises a plurality of apertured plate electrodes 342, the apertures of which define a funnel-shaped volume 645 that corresponds to a funnel section of the apparatus and, possibly, a short tunnel-shaped volume 644 having a longitudinal axis 119. In order to allow free flow of gas into the exhaust channel 610, a portion of the apertured electrodes are absent from a region of the apparatus that is upstream from the ion funnel and/or ion tunnel volumes and that is downstream from the secondary transfer tube 19, if present. These "missing" electrodes are replaced by an optional set of ion carpet electrodes 359 that are configured to receive oscillatory RF voltages in similar fashion to the manner in which such oscillatory RF voltages are received by the plurality of apertured plate electrodes 342. As shown in FIGS. 16A-16B, the space between the ion carpet electrodes 359 and the repeller electrodes 662*a*, 662*b*, 662*c* defines a first ion transport volume 668 of the apparatus 620. When energized with such RF voltages, the ion carpet electrodes 359 prevent loss of ions through the side of the apparatus along which the ion carpet electrodes are disposed. Accordingly, a pseudopotential well is formed in the vicinity of central longitudinal axis 47 and, as discussed above with reference to FIG. 3, it is preferable to orient the slotted-bore ion transfer tube 17 such that the central longitudinal axis 47 is contained within the slot plane 39 of the ion transfer tube. Ion carpets are well known to those of ordinary skill in the art. As illustrated in FIG. 16A, the axis 121 of the funnel-shaped volume 645 of the funnel apparatus 620 may be disposed at an angle to the overall central longitudinal axis 47 (or to a central longitudinal axis of an upstream ion tunnel section). Preferably, the angle of the axis 121 is such that the ion outlet aperture 46 is disposed along a projection line 49, that is taken parallel to the central longitudinal axis 47 of the ion outlet of the slotted-bore ion transfer tube 17. This funnel configuration reduces the overall size of the funnel apparatus, allows upgrading of existing mass spectrometer systems without a drastic change of their layout and assists in elimination of most neutral gas molecules and droplets that may enter the funnel-shaped volume 645.

Figure 17:
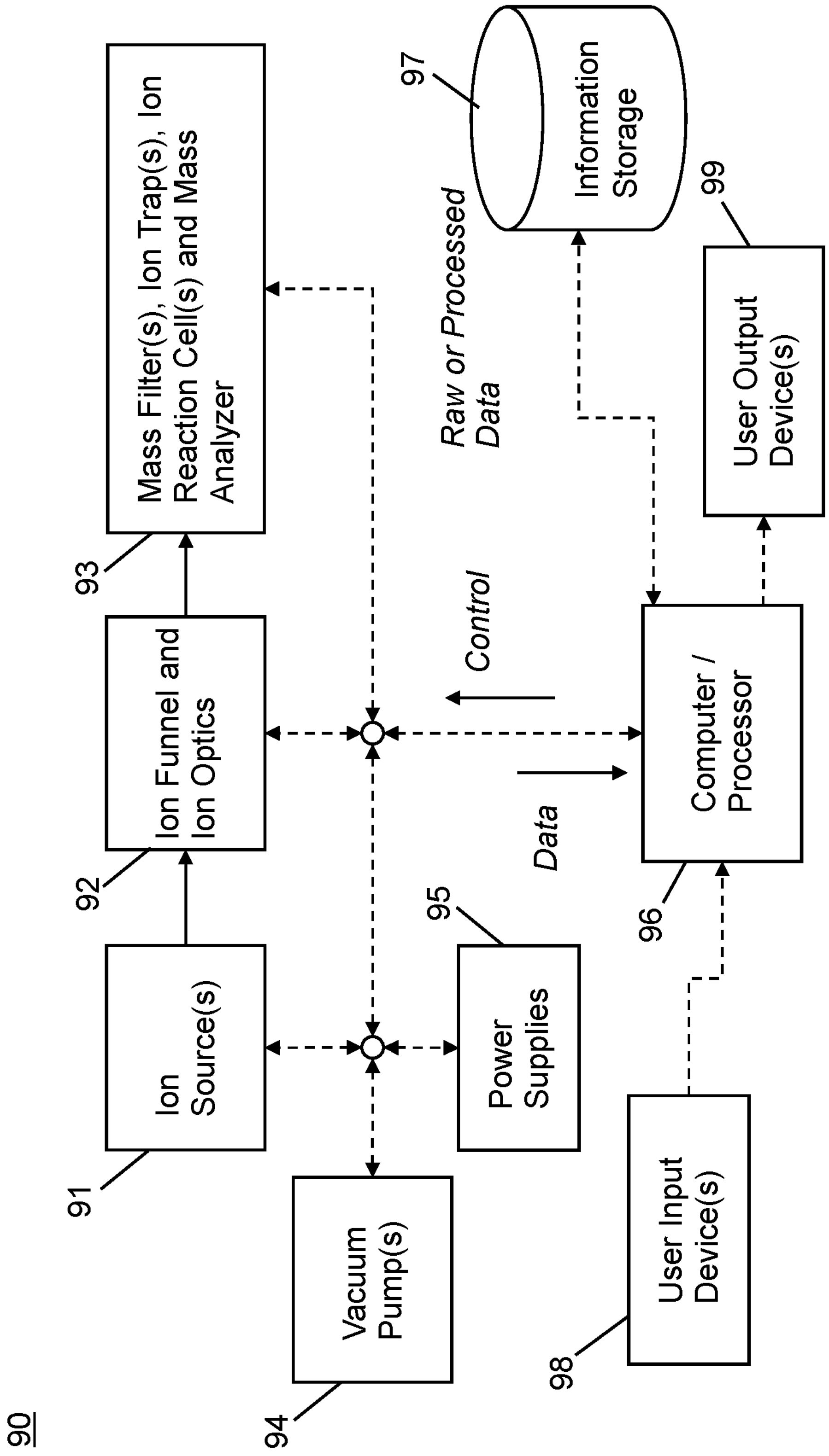
FIG. 17 is a schematic illustration of a generalized mass spectrometer system on which methods in accordance with the present teachings may be practiced.

FIG. 17 schematically illustrates a generalized mass spectrometer system 90 on which methods in accordance with the present teachings may be practiced. The mass spectrometer system includes a set of various hardware components, e.g., ion source(s) 91, an ion transport apparatus and other ion optical components 92 as taught herein, one or more mass filters, ion traps and/or mass analyzers 93, one or more vacuum pumps 94 and one or more power supplies 95. Various of the hardware components 91-95 comprise electrodes, electrical components or motors and may comprise various sensors and detectors, such as temperature sensors, pressure sensors, current sensors, ion detectors, etc. The various electrodes, other electrical components, motors and sensors are electrically or electronically coupled to a computer or other digital-logic controller processor apparatus 96. The electrical or electronic couplings, illustrated by dashed arrows in FIG. 17, convey control signals to the various hardware components 91-94 and may also convey data from the hardware components to the computer or controller 96. The computer or controller is also coupled to one or more data storage devices 97, various user input devices 98 such as keyboards, terminals, etc. and various user output devices 99.

In the context of the present teachings, the controller 96 may transmit control signals to the ion source(s) 91 to generate and provide ions of sample and/or calibrant materials to and through the ion funnel and other ion optical components. The ion funnel may comprise various of the features, possibly in combination, described in the above descriptions and accompanying drawings. The controller 96 may also transmit control signals to the one or more vacuum pumps 94 to evacuate the ion funnel and other mass spectrometer components. Pressure and temperature sensors within the ion funnel and/or other mass spectrometer components may transmit data back to the controller that is used by the controller to determine when the ion funnel and other mass spectrometer components are available and ready to measure data. Similarly, voltage sensors or ion current sensors within or associated with the ion funnel may transmit data to the controller that is used by the controller to control RF and DC voltages applied to plate electrodes and or repeller electrodes of the funnel in order to optimize ion transmission through the funnel to downstream mass spectrometer components. Various sensor data, operational configuration data and experimental data may be stored in the information storage device 97.

The discussion included in this application is intended to serve as a basic description. The present invention is not intended to be limited in scope by the specific embodiments described herein, which are intended as single illustrations of individual aspects of the invention. Functionally equivalent methods and components are within the scope of the invention. Various other modifications of the invention, in addition to those shown and described herein will become apparent to those skilled in the art from the foregoing description and accompanying drawings.

Not all of the various illustrated technical features and components are depicted and described for all possible embodiments. Features or components described for fewer than all of the illustrated embodiments are considered to be applicable to other embodiments, provided that they are not incompatible with those other embodiments. For example, the enlarged and expanded exhaust port 110 shown in the illustration of system 300 in FIG. 13A could be similarly employed in the system 100 (FIG. 3), or the system 400 (FIG. 14). Similarly, the alternative aperture shapes shown in FIGS. 11-12 with reference to the system 200 (FIG. 7) could likewise be employed within a portion of the system 300 (FIG. 13A) or the system 400 (FIG. 14). More generally, although electrode apertures are illustrated as circular or partially circular in shape, other aperture shapes, such as oval shapes, are possible.

Figure 5B:
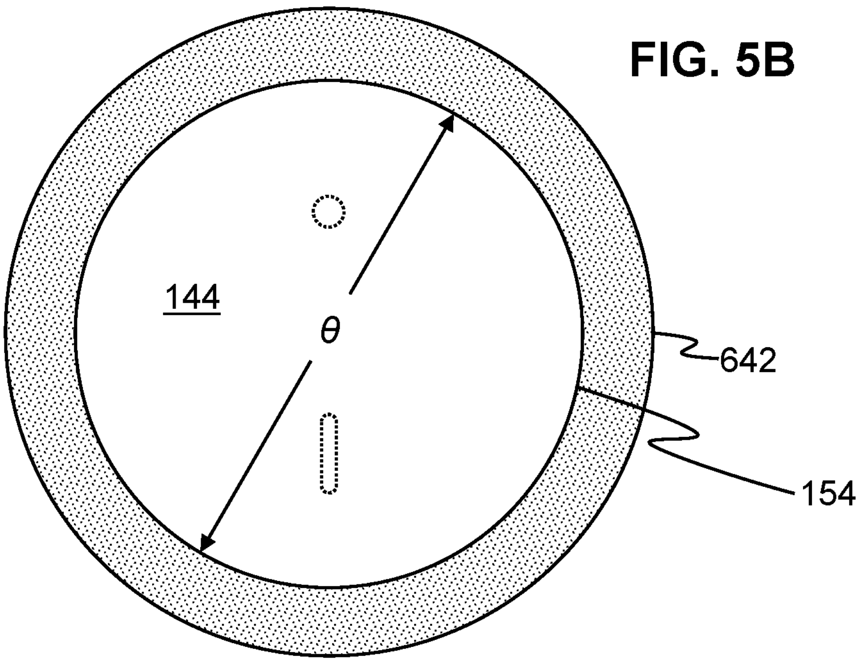
FIG. 5B is a schematic depiction of a ring electrode that may be used in place of the electrode plate of FIG. 5A.
Figure 9B:
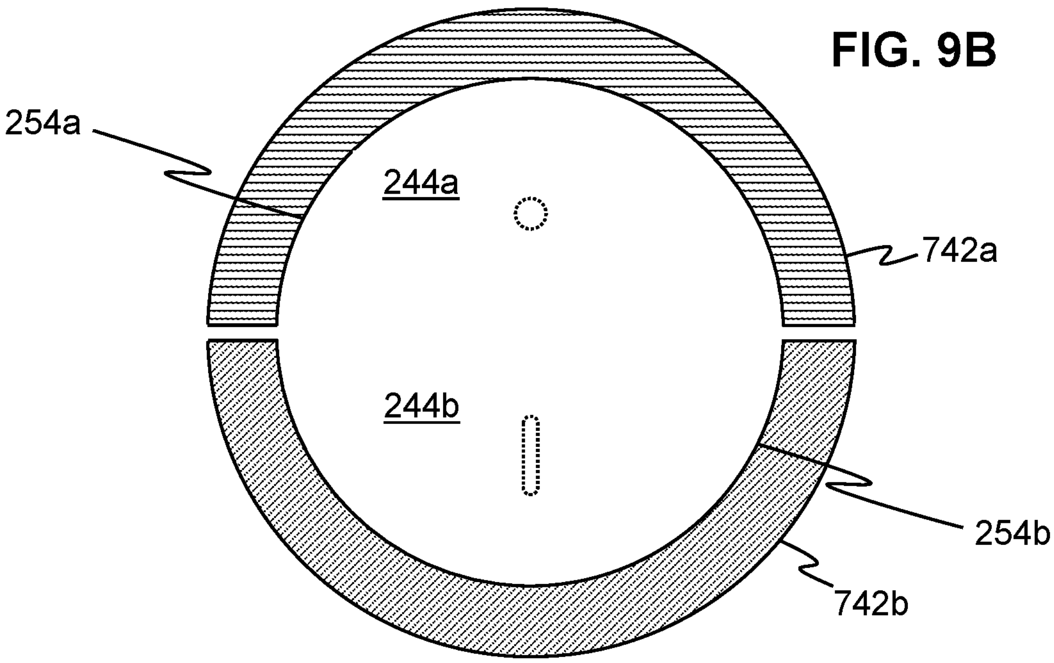
FIG. 9B is a schematic depiction of an electrode structure comprising a pair of half-rings that may be used in place of the electrode plate of FIG. 9A.

Further, the electrodes themselves need not be formed as square or rectangular metal plates. For example, FIG. 5B and FIG. 9B are alternative electrode forms in which the square plate electrodes 142 of FIG. 5A are replaced by ring electrodes 642 and the rectangular plate electrodes of 242*a*, 242*b* of FIG. 9A are replaced by half-ring electrodes 742*a* and 742*b*, respectively. In alternative embodiments, both plate and ring electrodes may be replaced by flat planar or ring-like films, foils or coatings that are supported on a rigid backing substrate, such as printed circuit board material.

Figure 9C:
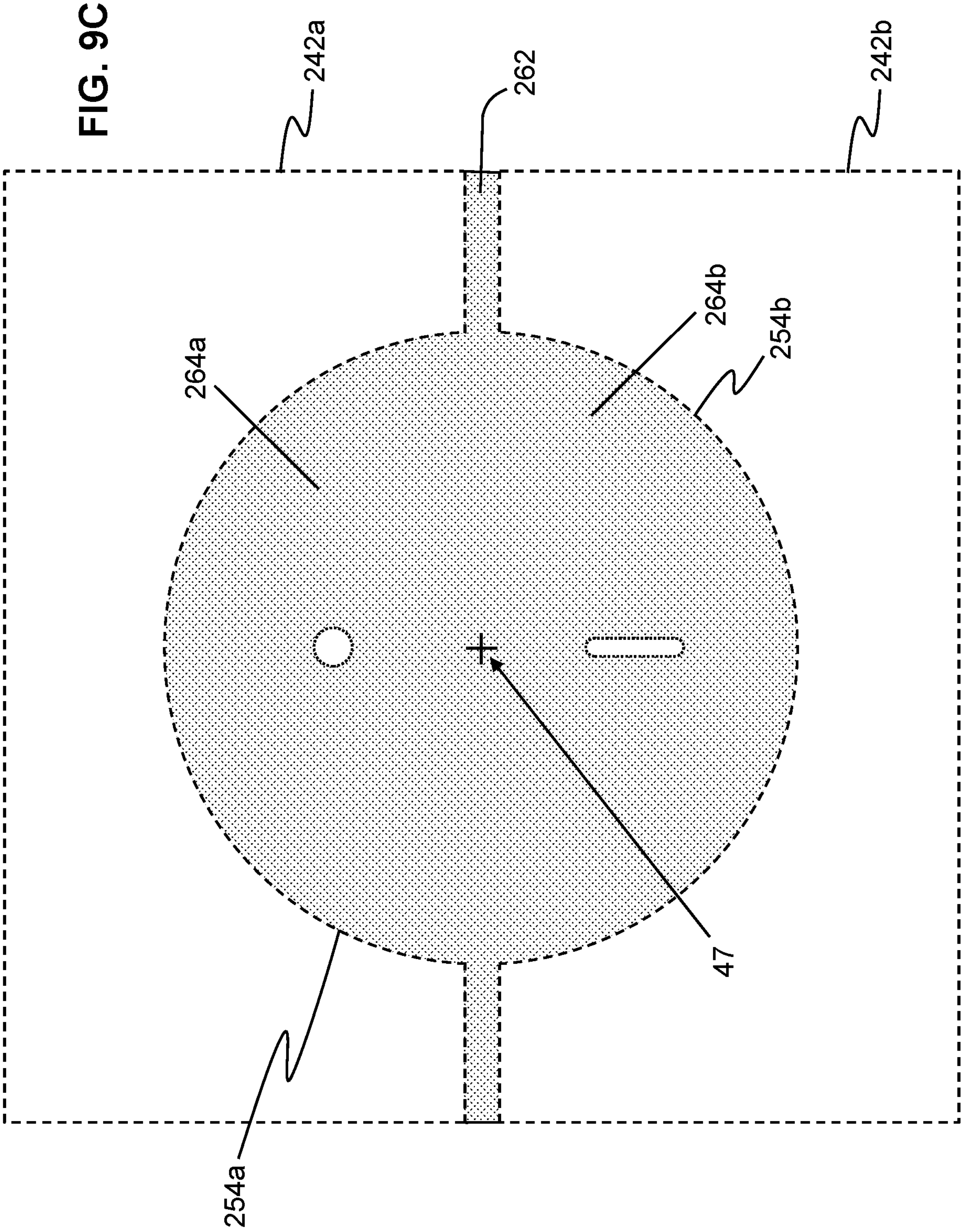
FIG. 9C is an enlarged view of the electrode pair of FIG. 9A, highlighting the space between the pair of electrode plates.

FIG. 9C is an enlarged version of FIG. 9A in which the spaced-apart electrodes 242*a*, 242*b* are outlined in phantom, using dashed lines. If the electrodes are in the form of rigid plates, then, the term "space between electrode pairs", as used herein, includes the entire shaded area, including the strip-like space 262 as well as the semi-circular spaces 264*a*, 264*b*. This statement applies to all embodiments taught herein that include pairs of rigid plate electrodes or ring electrodes wherein the two electrodes of each pair are oppositely disposed from one another across or relative to a central longitudinal axis 47. Upon introduction into an interior volume of an ion transport apparatus, gas and ions may occupy both the semi-circular spaces 264*a*, 264*b* as well as the portions of the strip 262 that are not within the circular space that is defined by the semi-circular spaces 264*a*, 264*b*. However, as ions migrate through the funnel apparatus, the ions will essentially become concentrated in a pseudopotential well zone surrounding the axis. With regard to embodiments in which the electrodes are not rigid plates but, instead, are films, coatings or foils disposed upon a rigid substrate, then the term "space between electrode pairs" only includes the space within the shaded area that is outlined by an aperture (or apertures) in the substrate, unless otherwise stated.

Any patents, patent applications, patent application publications or other literature mentioned herein are hereby incorporated by reference herein in their respective entirety as if fully set forth herein, except that, in the event of any conflict between the incorporated reference and the present specification, the language of the present specification will control.

What is claimed is:

1. A method of introducing ions generated from an atmospheric ion source into a vacuum chamber of a mass spectrometer system, comprising:

introducing the ions and gas into a first electrode section of an ion transport apparatus of the mass spectrometer system through a slotted bore of an ion transfer tube, the first electrode section comprising a first central longitudinal axis that is contained within a slot plane of the ion transfer tube wherein the ion transport apparatus further comprises:

a second electrode section configured to receive the ions from the first electrode section and comprising a second central longitudinal axis that is not coincident with the first central longitudinal axis; and an ion outlet aperture configured to receive the ions from the second electrode section and to transfer the ions to the vacuum chamber;

providing voltages to electrodes of the ion transport apparatus that urge the ions to migrate towards the second central longitudinal axis within the first electrode section; and removing a major portion of the gas through an exhaust port that is offset from the ion outlet aperture, wherein the introducing of the ions and gas into the first electrode section comprises introducing the ions and gas into an ion tunnel section that comprises:

a plurality of stacked, mutually parallel plate electrodes or ring electrodes, each plate electrode or ring electrode comprising an edge having a respective cutout therein; and a repeller electrode or repeller electrode assembly, wherein an ion transport volume of the first electrode section is defined between the repeller electrode or repeller electrode assembly and the plurality of plate electrodes or ring electrodes.

2. A method as recited in claim 1, wherein the providing of voltages to electrodes of the ion transport apparatus that urge the ions to migrate towards the second central longitudinal axis comprises applying a DC voltage difference between the repeller electrode or electrode assembly and the plurality of plate electrodes or ring electrodes.

3. A method as recited in claim 1, further comprising:

introducing an auxiliary flow of gas into the ion tunnel section from an auxiliary tube, wherein the introducing of the auxiliary flow of gas is simultaneous with the introducing of the ions and gas into the ion tunnel section through the slot of the slotted-bore ion transfer tube.

4. A method as recited in claim 3, wherein the introducing of the auxiliary flow of gas into the ion tunnel section further comprises introducing a flow of calibrant ions into the ion tunnel section.

5. A method of introducing ions generated from an atmospheric ion source into a vacuum chamber of a mass spectrometer system, comprising:

introducing the ions and gas into a first electrode section of an ion transport apparatus of the mass spectrometer system through a slotted bore of an ion transfer tube, the first electrode section comprising a first central longitudinal axis that is contained within a slot plane of the ion transfer tube, wherein the ion transport apparatus further comprises:

a second electrode section configured to receive the ions from the first electrode section and comprising a second central longitudinal axis that is not coincident with the first central longitudinal axis; and an ion outlet aperture configured to receive the ions from the second electrode section and to transfer the ions to the vacuum chamber;

providing voltages to electrodes of the ion transport apparatus that urge the ions to migrate towards the second central longitudinal axis within the first electrode section; and removing a major portion of the gas through an exhaust port that is offset from the ion outlet aperture, wherein the introducing of the ions and gas into the first electrode section comprises introducing the ions and gas into an electrode section that comprises:

a plurality of ion carpet electrodes; and a repeller electrode or repeller electrode assembly, wherein an ion transport volume of the ion tunnel is defined between the repeller electrode or repeller electrode assembly and the plurality of ion carpet electrodes.

6. A method as recited in claim 5, wherein the providing of voltages to electrodes of the ion transport apparatus that urge the ions to migrate towards the second central longitudinal axis comprises applying a DC voltage difference between the repeller electrode or electrode assembly and the plurality of ion carpet electrodes.

7. An ion transport system for a mass spectrometer comprising:

an ion transfer tube configured to receive ions from an atmospheric pressure ionization (API) ion source and comprising an ion outlet end; and an apparatus comprising:

a first electrode section configured to receive the ions from the ion outlet end of the ion transfer tube, wherein the first electrode section comprises a first ion transport volume therethrough; and an ion funnel comprising:

an ion inlet aperture that is configured to receive the ions from the first electrode section;

a second ion transport volume; and an ion outlet aperture that is configured to transfer the ions from the second ion transport volume to a mass analyzer, wherein the ion inlet aperture of the ion funnel is offset from a linear axis defined between the ion outlet end of the ion transfer tube and the ion outlet aperture of the ion funnel.

8. An ion transport system as recited in claim 7, wherein the first electrode section comprises:

a plurality of ion carpet electrodes; and a repeller electrode or repeller electrode assembly, wherein an ion transport volume of an ion tunnel is defined between the repeller electrode or repeller electrode assembly and the plurality of ion carpet electrodes.

9. An ion transport system as recited in claim 8, further comprising a power supply that is configurable to supply a DC voltage between the plurality of ion carpet electrodes and the repeller electrode or repeller electrode assembly, whereby the ions are urged to migrate towards a second central longitudinal axis within the first electrode section.

10. An ion transport system as recited in claim 7, wherein the first electrode section comprises:

a plurality of stacked, mutually parallel plate electrodes or ring electrodes, each plate electrode or ring electrode comprising an edge having a respective cutout therein; and a repeller electrode or repeller electrode assembly, wherein an ion transport volume of the first electrode section is defined between the repeller electrode or repeller electrode assembly and the plurality of plate electrodes or ring electrodes.

11. An ion transport system as recited in claim 10, further comprising a power supply that is configurable to supply a DC voltage between the plurality of stacked, mutually parallel plate electrodes or ring electrodes and the repeller electrode or repeller electrode assembly, whereby the ions are urged to migrate towards a second central longitudinal axis within the first electrode section.

12. An ion transport system as recited in claim 7, wherein the second ion transport volume of the ion funnel comprises at least first and second longitudinal axis that are not parallel to one another.

* * * * *